(12) United States Patent
Suhling

(10) Patent No.: US 12,415,290 B2
(45) Date of Patent: Sep. 16, 2025

(54) CUTTING TOOL FENCE APPARATUS WITH MEASURING RULER AND MOVEABLE MATERIAL STOP COMPONENT

(71) Applicant: Robert J. Suhling, Waukegan, IL (US)

(72) Inventor: Robert J. Suhling, Waukegan, IL (US)

(*) Notice: Subject to any disclaimer, the term of this patent is extended or adjusted under 35 U.S.C. 154(b) by 238 days.

(21) Appl. No.: 18/454,659

(22) Filed: Aug. 23, 2023

(65) Prior Publication Data
US 2025/0065530 A1 Feb. 27, 2025

(51) Int. Cl.
B27B 27/10 (2006.01)
B23D 59/00 (2006.01)
B27B 27/04 (2006.01)
G01B 3/1071 (2020.01)

(52) U.S. Cl.
CPC ............ *B27B 27/10* (2013.01); *B23D 59/001* (2013.01); *B27B 27/04* (2013.01); *G01B 3/1071* (2013.01)

(58) Field of Classification Search
CPC ........ B27B 27/00; B27B 27/08; B27B 27/10; B27B 27/04; G01B 3/1071
See application file for complete search history.

(56) References Cited

U.S. PATENT DOCUMENTS

| | | |
|---|---|---|
| 1,504,248 A | 8/1924 | Johnson |
| 1,823,268 A | 9/1931 | Gordon |
| 2,435,382 A | 2/1948 | Caskey |
| 4,693,158 A | 9/1987 | Price |
| 4,817,693 A | 4/1989 | Schuler |
| 4,871,156 A | 10/1989 | Kozyrski |
| 4,887,653 A | 12/1989 | Thomas |
| 4,987,813 A * | 1/1991 | Viazanko ............ B23D 47/025 144/286.5 |
| 5,018,562 A | 5/1991 | Adams |
| 5,038,486 A | 8/1991 | Ducate, Sr. |
| 5,040,443 A * | 8/1991 | Price ....................... B27B 27/06 144/287 |
| 5,063,983 A | 11/1991 | Barry |
| 5,197,365 A * | 3/1993 | Clifton ................... B23Q 17/22 83/522.19 |
| 5,267,818 A | 12/1993 | Marantette |
| 5,359,824 A | 11/1994 | Koberstein |
| 5,617,909 A * | 4/1997 | Duginske ............... B27B 27/10 403/381 |
| 5,664,612 A | 9/1997 | Klemma |
| 5,716,045 A | 2/1998 | Taylor |

(Continued)

FOREIGN PATENT DOCUMENTS

GB 2484821 A 4/2012

*Primary Examiner* — Adam J Eiseman
*Assistant Examiner* — Richard D Crosby, Jr.
(74) *Attorney, Agent, or Firm* — Lesavich High-Tech Law Group, S.C.; Stephen Lesavich

(57) ABSTRACT

A cutting tool fence apparatus with a flip stop connector, measuring ruler and moveable material stop. The cutting tool fence apparatus includes a measuring ruler included on the fence itself to provide a precise measuring system. The fence includes a connection apparatus to connect the fence to a flip-stop. The flip-stop allows a tape measure to be used to provide a precise measurements with the measuring ruler imprinted on the fence. The fence is also used as a zero-clearance fence with a moveable material stop component that can be adjusted both vertically and horizontally to securely hold a piece of material for cutting.

22 Claims, 19 Drawing Sheets

(56) References Cited

U.S. PATENT DOCUMENTS

| | | | |
|---|---|---|---|
| 5,755,148 A * | 5/1998 | Stumpf | B27B 27/04 83/468.6 |
| 5,765,448 A | 6/1998 | Martelli | |
| 5,768,966 A | 6/1998 | Duginske | |
| 5,787,599 A * | 8/1998 | Clifton | G01B 3/1071 33/760 |
| 5,845,555 A | 12/1998 | Dawley | |
| 5,890,524 A | 4/1999 | Tucker et al. | |
| 5,903,125 A | 5/1999 | Prentice et al. | |
| 5,919,014 A | 7/1999 | Weck et al. | |
| 6,328,510 B1 | 12/2001 | Hanrath et al. | |
| 6,557,601 B1 | 5/2003 | Taylor | |
| 6,851,243 B1 | 2/2005 | Sandford | |
| 6,851,345 B1 | 2/2005 | Kennelly | |
| 6,899,005 B1 * | 5/2005 | O'Banion | B23Q 11/0042 83/477.1 |
| 7,036,540 B2 | 5/2006 | Welsh et al. | |
| 7,100,515 B2 | 9/2006 | Helm et al. | |
| 7,165,338 B2 * | 1/2007 | Clifton | B27B 27/04 33/630 |
| 7,261,502 B2 | 8/2007 | Pasquetto | |
| 7,543,522 B2 * | 6/2009 | Chen | B27B 27/00 83/490 |
| 7,546,790 B2 * | 6/2009 | Parks | B27B 25/10 83/477.2 |
| 7,587,838 B2 | 9/2009 | Mastrobattista | |
| 8,033,535 B2 | 10/2011 | Mannon | |
| 8,091,250 B1 * | 1/2012 | Jinks | G01B 3/1056 33/758 |
| 8,220,374 B2 | 7/2012 | Wang | |
| 8,266,996 B2 * | 9/2012 | Thomas | B27B 27/08 83/490 |
| 8,272,334 B2 | 9/2012 | Wang et al. | |
| 8,342,055 B2 | 1/2013 | Wang et al. | |
| 8,463,765 B2 | 6/2013 | Lesavich | |
| 8,480,067 B2 | 7/2013 | Furlow | |
| 8,495,939 B2 * | 7/2013 | Kani | B27B 27/08 83/490 |
| 8,549,970 B2 * | 10/2013 | Stone | B27B 27/08 83/490 |
| 8,621,969 B2 | 1/2014 | Dawley, III | |
| 8,661,956 B2 | 3/2014 | Thomas | |
| 9,037,564 B2 | 5/2015 | Lesavich et al. | |
| 9,056,402 B2 | 6/2015 | Clark | |
| 9,137,250 B2 | 9/2015 | Lesavich et al. | |
| 9,361,479 B2 | 6/2016 | Lesavich et al. | |
| 9,545,734 B2 | 1/2017 | Suhling | |
| 9,569,771 B2 | 2/2017 | Lesavich et al. | |
| 9,616,587 B2 | 4/2017 | Xu | |
| 9,682,454 B2 | 6/2017 | Suhling | |
| 10,022,887 B2 | 7/2018 | Hogenhout | |
| 10,245,653 B2 | 4/2019 | Suhling | |
| 10,335,974 B2 * | 7/2019 | Chiang | B27B 5/222 |
| 10,336,127 B1 | 7/2019 | Suhling | |
| 10,661,457 B2 | 5/2020 | France | |
| 10,766,109 B2 | 9/2020 | Suhling | |
| 10,836,066 B2 | 11/2020 | Suhling | |
| 10,858,058 B2 | 12/2020 | Suhling | |
| 11,180,171 B1 | 11/2021 | Suhling | |
| 11,383,336 B2 | 7/2022 | Suhling | |
| 11,650,038 B1 * | 5/2023 | Fisher | G01B 3/12 33/772 |
| 12,202,063 B2 * | 1/2025 | Wille | G01B 3/1071 |
| 2005/0056345 A1 | 3/2005 | Duginske | |
| 2005/0268766 A1 * | 12/2005 | Chen | B23D 45/044 83/490 |
| 2008/0053283 A1 | 3/2008 | Lin | |
| 2008/0282862 A1 * | 11/2008 | Wise | B27B 27/10 83/468.2 |
| 2009/0095141 A1 | 4/2009 | Billings | |
| 2010/0064869 A1 * | 3/2010 | Poole | G05B 19/401 83/72 |
| 2011/0048202 A1 * | 3/2011 | Peterson | B23D 59/001 83/522.18 |
| 2011/0208710 A1 | 8/2011 | Lesavich | |
| 2012/0278622 A1 | 11/2012 | Lesavich et al. | |
| 2014/0026725 A1 | 1/2014 | Makropoulos | |
| 2014/0189792 A1 | 7/2014 | Lesavich et al. | |
| 2015/0298273 A1 | 10/2015 | Suhling | |
| 2015/0306784 A1 | 10/2015 | Suhling | |
| 2015/0379301 A1 | 12/2015 | Lesavich et al. | |
| 2016/0321654 A1 | 11/2016 | Lesavich et al. | |
| 2018/0043439 A1 | 2/2018 | Suhling | |
| 2019/0339051 A1 * | 11/2019 | Echols | G01B 5/02 |
| 2019/0381614 A1 | 12/2019 | Suhling | |
| 2019/0389500 A1 | 12/2019 | Suhling | |
| 2020/0001495 A1 * | 1/2020 | Suhling | B27B 27/04 |
| 2020/0215713 A1 | 7/2020 | Friedebach | |
| 2021/0394319 A1 * | 12/2021 | Suhling | B27B 27/10 |
| 2023/0140756 A1 * | 5/2023 | Donnell | B27B 27/08 33/628 |
| 2023/0294321 A1 * | 9/2023 | Cluff | B27B 27/02 83/522.16 |

\* cited by examiner

CUTTING TOOL FENCE APPARATUS WITH MEASURING RULER AND MOVEABLE MATERIAL STOP COMPONENT

CROSS REFERENCES TO RELATED APPLICATIONS

Not Applicable.

FIELD OF INVENTION

This application relates to fences used with cutting devices such as saws. More specifically, it relates to a cutting tool fence apparatus with measuring ruler and material stop component.

BACKGROUND OF THE INVENTION

When a saw such as a table top saw, a chop saw, miter saw, etc. is used to cut a material, such as wood, metal, plastic, a fence is used.

A fence keeps material pieces square to a cutting blade on a saw for accuracy, and allows the use of stops for repeat cuts and align the material to keep it straight while being cut. A fence typically has one or more, moveable and flipable stops to hold a material in place at a desired distance along the fence.

There are several problems associated with fences used for cutting saws. One problem is that many fences that are made out of metal or plastic do not provide an absolute square surface between a surface of the cutting and the fence, the cut on the material is not exactly square (i.e., 90 degrees) as the fence is not manufactured absolutely square.

Another problem is that most fences do not do not have pre-drilled holes to attach the fence to a cutting saw stand.

Another problem is that most fences do not have a measuring ruler imprinted on the fence itself to provide a precise measuring system on the fence itself.

Another problem is that most fences do not provide a connection apparatus to connect the fence to a flip-stop.

Another problem is that most fences do not provide a connection apparatus to connect the fence to a flip-stop so a tape measure can be used to provide precise measurements with the fence.

Another problem is that most fences do not provide a connection apparatus to connect the fence to a flip-stop so a tape measure can be used to provide precise measurements with a precise measuring system imprinted on the fence.

Another problem is that most fences cannot be used with a flip-stop as a zero clearance fence.

Another problem is that most fences do not have a moveable material stop that can be moved back and forth horizontally and in and out horizontally to securely hold materials over varying widths and used with a flip-stop on a zero-clearance fence.

Another problem is that most fences do not have a moveable material stop that can be moved back and forth horizontally, in and out horizontally and up and down vertically, to securely hold materials over varying widths and heights used with a flip-stop on a zero-clearance fence.

There have been several attempts to solve some of the problems associated with fences used with cutting tools.

For example, U.S. Pat. No. 11,383,336, that issued to Suhling teaches "A reversible flip-away work-stop for strut systems. The reversible flip-way work stop includes a first component allowing a work stop positioning plate to pivot in a semi-circular motion allowing the work stop positioning plate to be moved and immediately configured in a right-handed configuration or a left-handed configuration without manual disassembly and reassembly in a strut in a strut system. A second component allowing the work stop positioning plate to be micro-adjusted to measurements including thousands of an inch for precisely measuring a material to be cut. A third component includes a pre-determined length to exactly match an alignment of a front face of the work stop positioning plate allowing a measurement to be read on a measuring component in the strut on the strut system without obstruction. The third component also including a pre-determined width and shape matching a width and a shape of a measuring component in the strut on the strut system allowing easy movement of the reversible flip-away work stop within the strut in the strut system and providing the ability to add a custom measuring component to the strut system."

U.S. Pat. No. 10,766,109, that issued to Suhling teaches "The invention allows for alignment perpendicular to a track engaged by a securing nut. An opposing tooth key type aligner has two functions: keeps the second track perpendicular to the first track and allows the securing nut to always be correctly oriented to engage with the track. A bolt clamps the securing nut to the track to lock the position of the invention. A second axis perpendicular to the lower track is created with a second track. A bolt connected to a coupler nut engages with the middle track to create a third axis perpendicular to both previous axes. A washer provides a neutral bearing surface between the coupler nut and second track. An elevation bolt sets the vertical position of the object to be mounted. A bolt can be used to fasten an object to the end of the elevation bolt."

U.S. Pat. No. 10,836,066, that issued to Suhling teaches "A Zero Clearance Fence that gives precision to chop saw fences. The invention consists of two flat surfaces and mounting devices. The flat surfaces are beveled at one edge of both surfaces. The beveled edge allows a tape measure to be hooked on at any desired miter angle. The invention mounts onto the original chop saw fences so that they are able to slide towards and away from the saw blade. The ability to slide allows the fences to always be right next to the saw blade at any miter angle cut for precision in the cut measurements. The mounting apertures can be located anywhere to allow the Zero Clearance Fence to fit on any chop saw."

U.S. Pat. No. 9,682,454, that issued to Suhling teaches "An in-line indexing mechanism as part of a work-stop system which employs a lead screw to alter the relative distance between a work-stop plate and a swing arm—as well as alignment pins and springs to maintain contact and rigidity between this work-stop plate and swing arm—in order to precisely alter the parameters of a workpiece plane. In particular, the indexing mechanism of the preferred embodiment resides within the extension of an arm, and is located, by default, within the workpiece plane; the act of indexing therefore exerts force upon a workpiece along a coincident axis within said workpiece plane. Additionally, the indexing mechanism may be removed from the workpiece plane, by way of axially rotating the arm, without abandoning the original workpiece parameter and adjustment values."

U.S. Pat. No. 9,545,734, that issued to Suhling teaches "A clamp that is meant to act as a coordinate locator for any number of power tools, but most specifically for use with the Biesemeyer T-style table saw fences. The assembly is comprised of a C-frame which offers the ability to enact, a clamping action and the ability to enact an indexing action.

The design of the assembly allows not only for the clamping of an imprecise reference point along a table saw fence, but also the fine adjustment of indexing a screw against the table saw fence."

However, these solutions still do not solve all of the problems associated with fences used for cutting tools. Thus, it is desirable to solve some of the problems associated with protective fences used for cutting tools.

SUMMARY OF THE INVENTION

In accordance with preferred embodiments of the present invention, some of the problems associated with protective fences for cutting tools are overcome. A cutting tool fence apparatus with a flip-stop connector, measuring ruler and material stop component is presented.

A cutting tool fence apparatus with a flip stop connector, measuring ruler and moveable material stop. The cutting tool fence apparatus includes a measuring ruler imprinted on the fence itself to provide a precise measuring system. The fence includes a connection apparatus to connect the fence to a flip-stop. The flip-stop allows a tape measure to be used to provide a precise measurements with a measuring ruler include on the fence. The fence is also used as a zero-clearance fence with a moveable material stop component that can be adjusted both vertically and horizontally to securely hold a piece of material for cutting.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Exemplary Cutting Tool Fence Apparatus With Self-calibrating Scale

Figure 1:
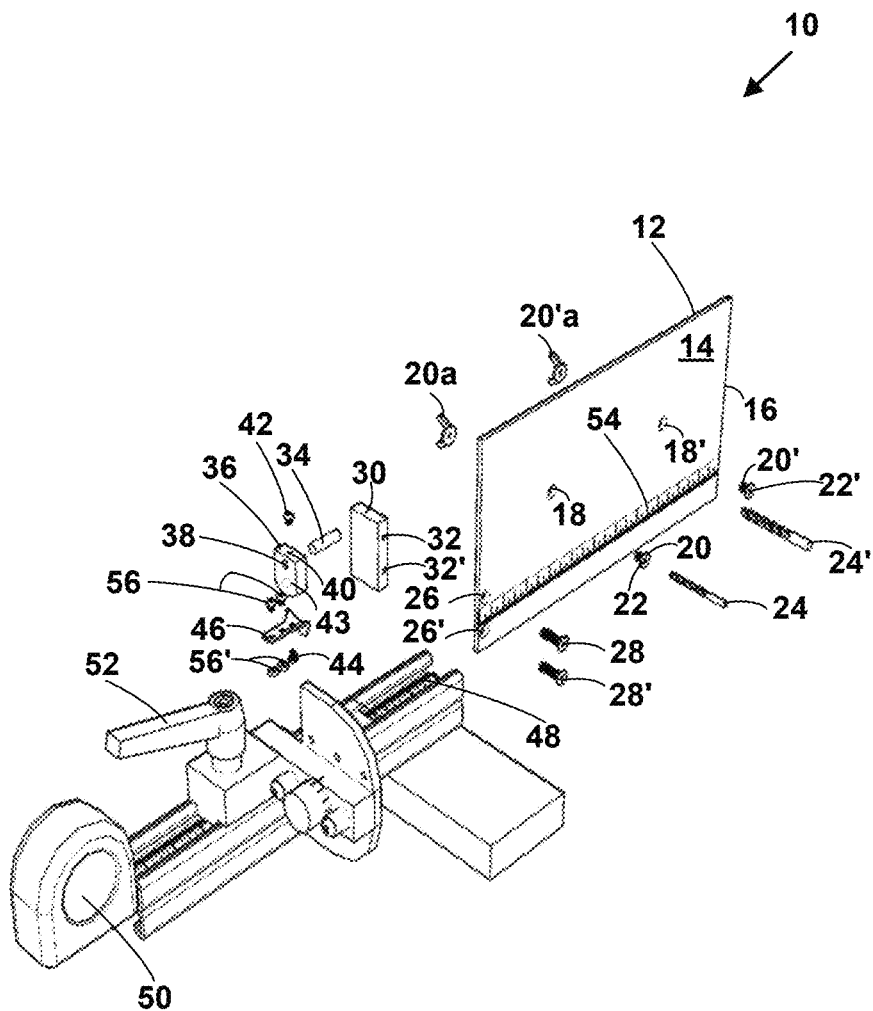
FIG. 1 is a block diagram illustrating an exploded view of cutting tool fence apparatus with measuring ruler.

FIG. 1 is a block diagram 10 illustrating an exploded view of cutting tool fence apparatus 12 with measuring ruler.

The apparatus 12 includes a fence component 14 with three edges and one beveled edge 16. The beveled edge 16 is an edge to allow a saw blade on a cutting saw to safely make a cut on a piece of material. The fence component 14 is precisely manufactured so the three edges includes corners of precisely ninety degrees.

In one embodiment, the fence component 14 is manufactured with a metal material. Whenever a metal stretches, it is under a tensile force. Mathematically, the tensile force equals force/area. The maximum stress a metal can handle represents its tensile strength. Whenever a metal is compressed, it is under a compressive force. A compressive force represents a maximum compression or pressure a metal can handle without breaking. There is a reduction in the length in comparison to its original measure. In such an embodiment, the fence component 14 is manufactured with a process taking into account the tensile and compressive forces in the metal around the fence component 14, so the resulting fence component 14 is manufactured with precise edges and precise ninety degree corners. This manufacturing process also prevents the fence component 14 from being deformed by an equilibrium process after manufacturing.

The maximum value of compressive strength and tensile strength varies between metals. Some metals have better tensile strength under tension, whereas some metals are good at handling maximum compressive force.

For example, steel has higher tensile strength and yield strength than aluminum. However, aluminum is lightweight and offers better resistance to corrosion than steel. In one embodiment, the fence component 14, is precisely manufactured from a steel and/or stainless steel and/or aluminum material. However, the present invention is not limited to such an embodiment and other embodiments, with other metals can be used to practice the invention.

The fence component 14 further includes one or more first countersunk receptacles 18, 18' (only two of which are illustrated for simplicity) for attaching the fence component 14 to a stand for a cutting saw. The one or more first countersunk receptacles 18, 18' allow the fence component 14 to be adjusted on the stand for the cutting saw with a desired precision if the stand for the cutting saw was not manufactured with precise measurements or becomes damaged with use.

In one embodiment, the fence component 14 includes, but is not limited to, fence components 14 described in U.S. Pat. No. 10,836,066, and 10,766,109 that issued to Suhling, the inventor on the present application, the contents of which are incorporated by reference. However, the present invention is not limited to such an embodiment and other embodiments can be used for the flip-stop 52 to practice the invention In one embodiment, the stand for the cutting saw includes a channel-based work-stop assemblies can be characterized as work-stops which use a strut, rail or track system to allow for proper alignment and mobility of the work-stops in relation to these components. Flip-away systems with flip stops are able to be temporarily moved and removed from the material work-piece plane, which is often accomplished through a flipping movement of axial rotation away from the material work-piece plane. Flip-away systems allow for quick and easy operation, but are often criticized for imprecision and can suffer from excessive pliability. However, the present invention is not limited to such an embodiment and other embodiments can be used to practice the invention.

The apparatus 12 further includes one or more first attachment means 20, 20' (only two of which are illustrated for simplicity) to attach the fence component 14 to the stand for the cutting saw. In one embodiment, the one or more first attachment means 20, 20' include a screw and/or a bolt with a hollow central receptacle 22, 22' precisely manufactured to accept a drill bit 24, 24'. The one or more first attachment means 20, 20' are placed in a desired position in the one or more first countersunk receptacles 18, 18' and a drill bit 24, 24' is inserted into the hollow central receptacle 22, 22'. The hollow central receptacle 22, 22' ensures the drill bit 24, 24' will drill a circular guide hole in the stand for the cutting saw at the exact desired location and prevent the guide hole being drilled from being an oblong shape or oval shape as it is drilled. The first attachment means 20, 20' include corresponding fasteners 20*a*, 20'*a* illustrated as wing nut fasteners in FIG. 1.

The apparatus 12 further includes one or more second countersunk receptacles 26, 26' on the fence component 14 to attach the fence component 14 with one or more second attachment means 28, 28' to a fence attachment component 30.

The fence attachment component 30 includes one or more hollow receptacles 32, 32' for accepting one or more attachment means 28, 28' to attach the flip stop attachment component 30 to fence component 14. In one embodiment, the fence attachment component 30 includes a magnetic material that will attract a magnet.

A "magnetic material" is a material that experiences a force when placed in a magnetic field. Although all magnetic materials are metallic, not all metals are magnetic. Common metals that attach to magnetic materials include: iron, steel, nickel, cobalt, etc. However, the present invention is not limited to such and embodiment and other embodiments may be used to practice the invention.

The fence attachment component 30 further includes a magnetic component 34. The magnet component 34 allows the fence attachment component 30 to be temporarily attachable and removable to a tape measure connection component 36 connected to a tape measure 50.

In one embodiment, the magnet component 34 includes a cylinder shaped magnet component 34. However, the present invention is not limited to such an embodiment and other shapes for the magnet component 34 can be used to practice the invention.

The tape measure connection component 36 includes a first hollow receptacle 38 in side surface of the tape measure connection component 36 to accept the magnet component 34. The tape measure connection component 36 further includes a second hollow receptacle 40 on a top surface of the tape measure connection component 36 intersecting a top portion of the first hollow receptacle 38. The second hollow receptacle 38 accepts a first set screw 42 to engage and hold a portion of the magnet component 32 to securely keep the magnet component 32 in place within the first hollow receptacle 38 of the tape measure connection component 36. The tape measure connection component 36 further includes a third hollow receptacle 43 on a bottom surface of the tape measure connection component 36. The third hollow receptacle 42 accepts a second set screw 44 for connecting a tape measure hook component 46 on a blade 48 component of a tape measure 50. The tape measure connection component 36 is used within a flip stop component 52. The tape measure component 36 may be further attached to the tape measure hook component 46 with optional additional attachment means 56, 56', illustrated as a pair of nuts and bolts.

In one embodiment, the flips-top component 52 includes, but is not limited to, a flip-stop 52 described in U.S. Pat. Nos. 11,383,336 and 9,682,454, that issued to Suhling, the inventor on the present application, the contents of which are incorporated by reference. However, the present invention is not limited to such an embodiment and other embodiments can be used for the flip-stop 52 to practice the invention.

The apparatus 12, further including a measuring ruler 54 on a front surface of the fence component 14 with the same measuring ruler and markings (e.g., 1/64 inches, 0.396875 millimeters (mm) etc.) on the blade of the tape measure 50 allowing measurements of materials placed against the front surface on the fence component 14 continuing to the blade of the tape measure 50 as the flip stop component 52 including the tape measure 50 is moved horizontally away from the fence component 14 along the stand for the cutting saw, the tape measure 50 connected magnetically to fence component 14 via the tape measure connection component 36 and the magnet component 34.

In one embodiment, the measuring ruler 54 includes U.S. measurements (e.g., inches, feet, etc.), metric measurements (e.g., centimeters, meters, etc.) or proprietary measurements (for measuring a standard piece of material repeatedly cut, etc.). However, the present invention is not limited to such embodiments and the measuring ruler 54 include other measuring systems to practice the invention.

Figure 4:
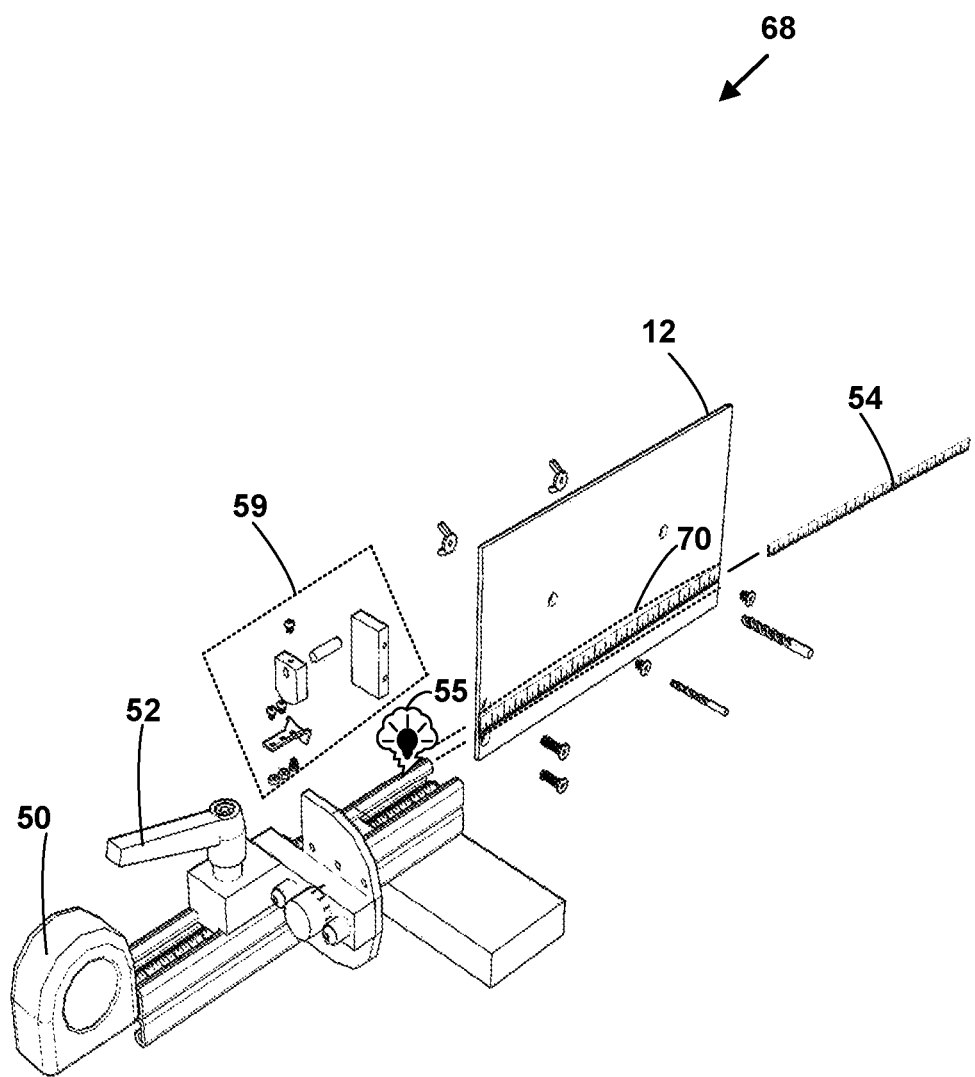
FIG. 4 is a block diagram illustrating a flip stop component used with the cutting tool fence apparatus with removable measuring ruler.

In one embodiment, the measuring ruler 54 is engraved on the fence component 14. In another embodiment, the measuring ruler 54 is etched on the fence component 14. In another embodiment, the measuring ruler 54 is a sticker. In another embodiment, the measuring ruler 54 is insertable/removable in a slot 70 in the fence component 14 (FIG. 4).

However, the present invention is not limited to such embodiments and other embodiments can be used to practice the invention.

In one embodiment, the measuring ruler 54 is projected on the fence component 14 with a projection component 55 including in the flip stop component 52, including but not limited to a laser, Light Emitting Diode (LED) or other projection component used as a visual measuring aid. However, the present invention is not limited to such embodiments and other embodiments can be used to practice the invention.

Returning to FIG. 1, in one embodiment, the tape measure 50 includes a modified tape measure. The modified tape measure includes removing the tape measure hook component, removing a portion of the blade equivalent to the pre-determined length of the measuring ruler 54 on the fence component 14, attaching the tape measure connection component to the tape measure hook component 36, reattaching the tape measure hook at a new end of the blade of the tape measure 54 resulting after the portion of the blade was removed. The modified tape measure allowing continuous accurate measurements of materials placed against the front surface on the fence component 14 with the measuring ruler 54 continuing to the blade of the tape measure as the flip stop component 52 including the tape measure is moved horizontally away from the fence component 14 along the stand for the cutting saw. However, the present invention is not limited to such an embodiment and other embodiments can be used to practice the invention.

For example, if the fence component was twelve inches in length, then the hook is removed from the blade component of the tape measure 50, the first twelve inches (30.48 centimeters (cm)) of the blade are remove and the hook is re-attached at the twelve inch mark. So a piece of material to be cut at the sixteen inch (40.64 cm) mark, would be measured using the twelve inches from the measuring ruler 30 on the fence component 14 and four inches from the tape measure 50 on the flip stop component 52.

Figure 2:
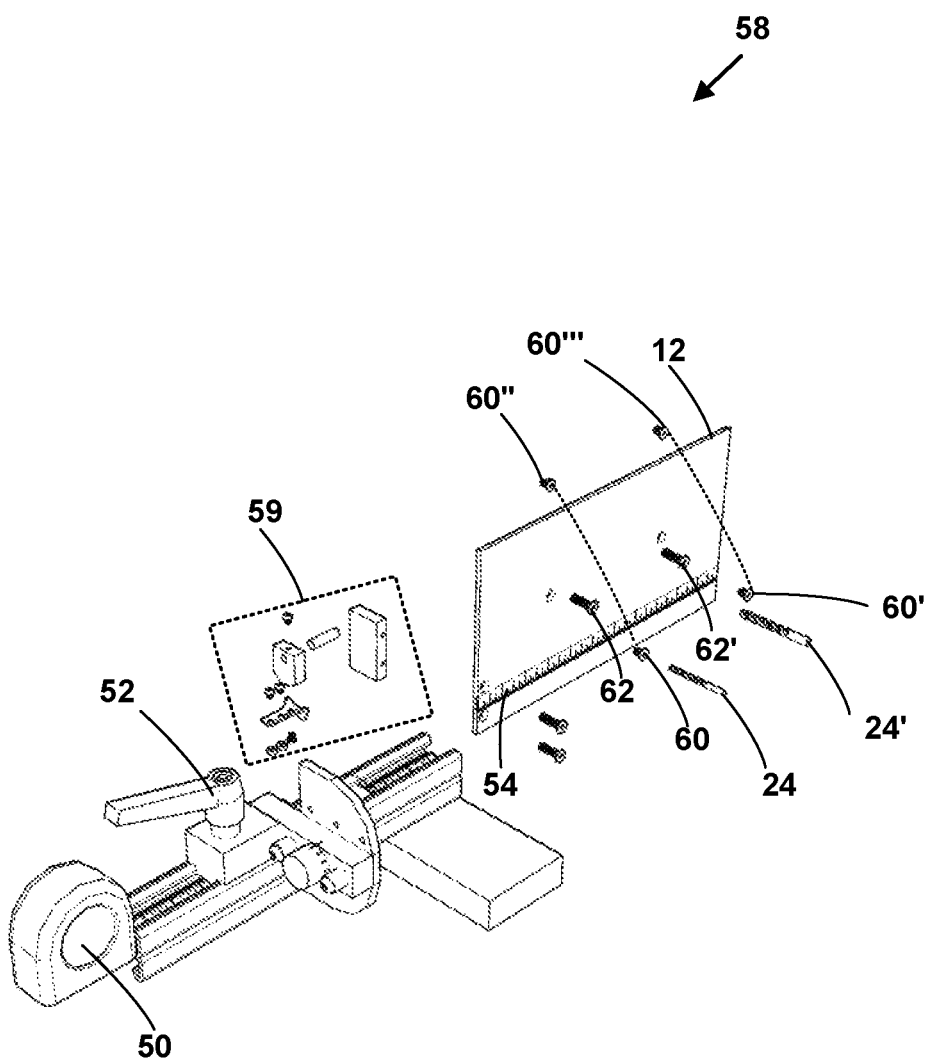
FIG. 2 is a block diagram illustrating an exploded view of a cutting tool fence apparatus with measuring ruler.

FIG. 2 is a block diagram 58 illustrating an exploded view of cutting tool fence apparatus 12 with measuring ruler 54.

FIG. 2 illustrates a flip stop attachment set 59 including, components 30-46 and 56, 56'.

In one embodiment the first attachment means 60, 60' includes a screw and/or a bolt with a hollow central receptacle precisely manufactured to accept a drill bit 24, 24'. After the guide holes are drilled, the first attachment means 60, 60', are re-used with other attachment means 62, 62' as a tightening means 60" 60''' (e.g., a nut for a corresponding bolt).

Figure 3:
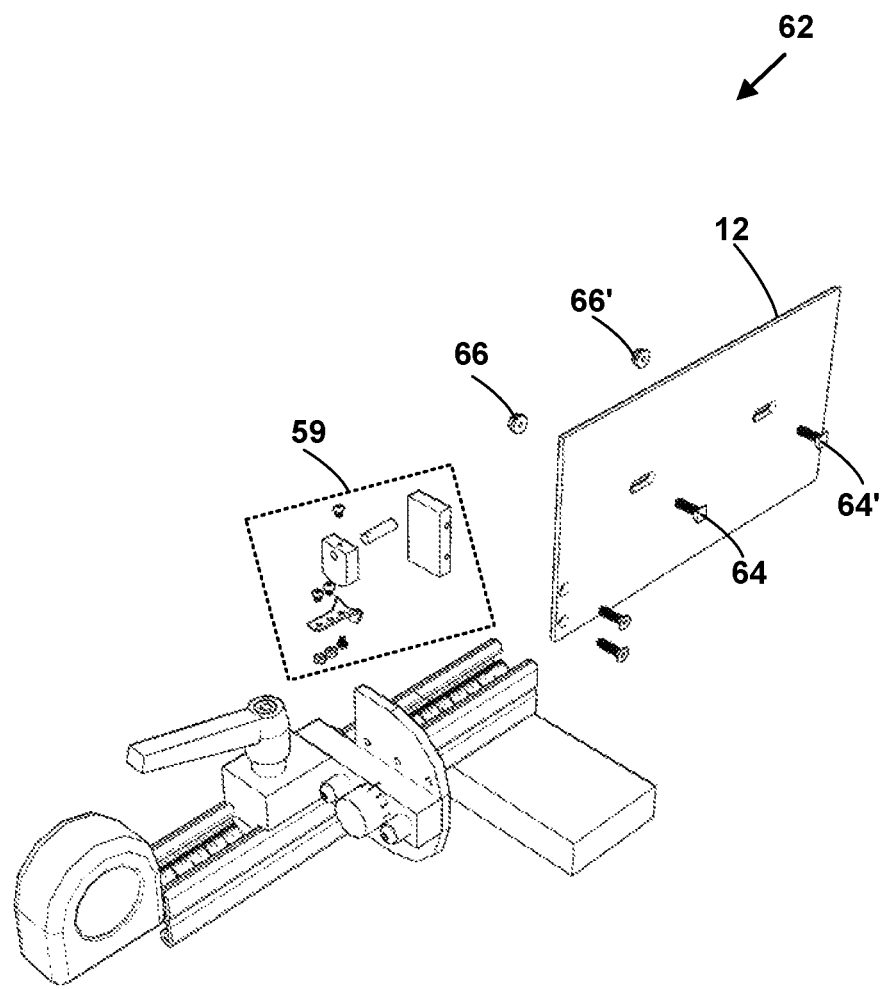
FIG. 3 is a block diagram illustrating an exploded view of a cutting tool fence apparatus without measuring ruler.

FIG. 3 is a block diagram 60 illustrating an exploded view of cutting tool fence apparatus 12 without measuring ruler 54.

In such an embodiment, the fence component 14 does not include the measuring ruler 54.

In one embodiment, the first attachment means 20, 20' are replaced with another type of attachment means without a hollow central receptacle.

In one embodiment, the attachment means 60, 60' includes a screw or bolt with a triangular head that fits flat and securely in the one or more first countersunk receptacles 18, 18'. The attachment means 60, 60' include a corresponding tightening means 62, 62' including a nut. However, the present invention is not limited to such an embodiment and other embodiments may be used to practice the invention.

Figure 5:
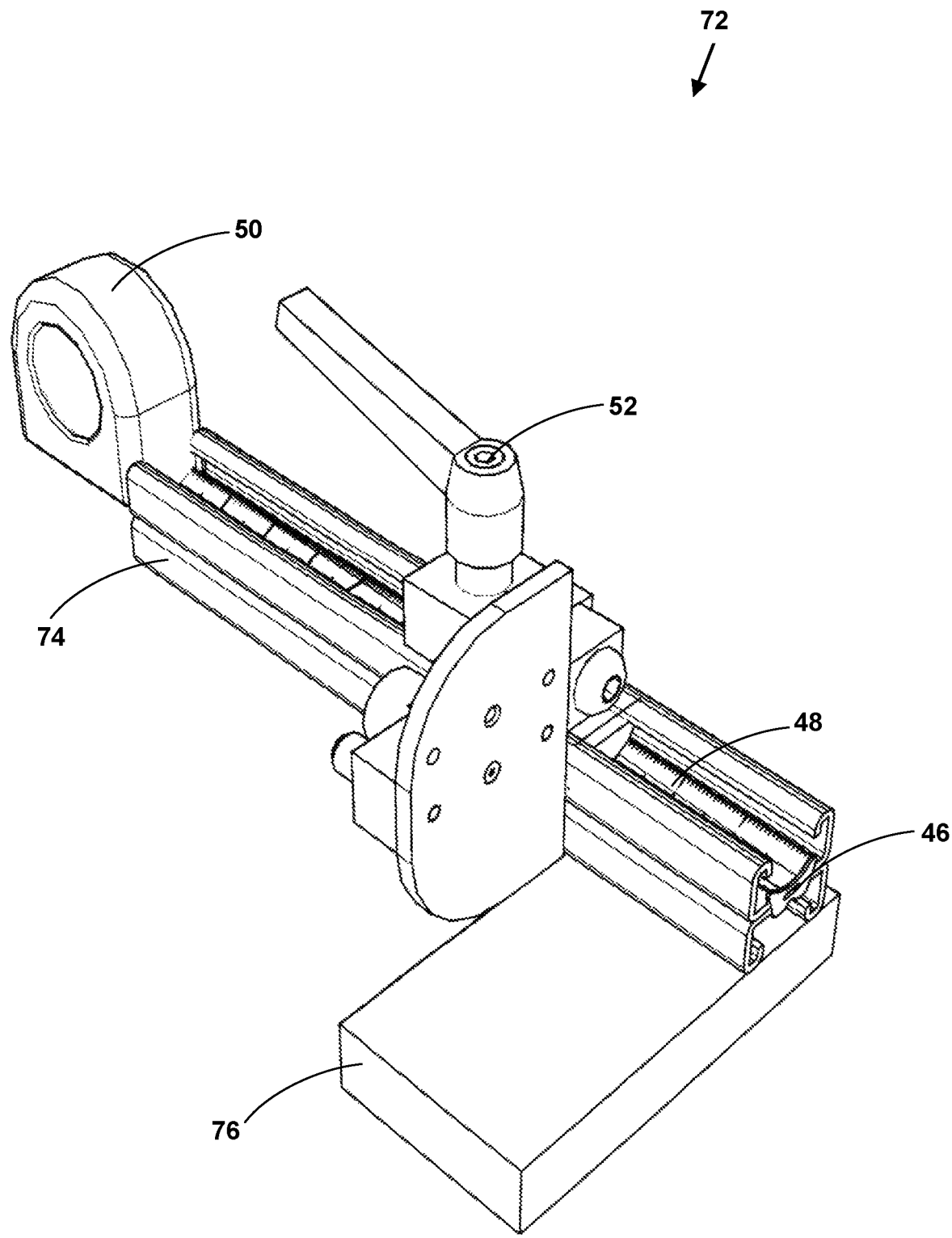
FIG. 5 is a block diagram illustrating a flip stop component used with the cutting tool fence apparatus with removable measuring ruler.

FIG. 5 is a block diagram 72 illustrating a flip stop component 52 used with the cutting tool fence apparatus 12 with measuring ruler 54.

In one embodiment, the flip stop component 52 includes the reversible flip-stop component included in U.S. Pat. No. 11,383,336, entitled "Reversible flip-away work stop for strut systems," that issued to Robert J. Suhling, the same inventor as the present application. However, the present invention is not limited to such an embodiment, and other embodiments can be used to practice the invention.

In one embodiment, the stand for the cutting saw includes a channel-based strut, rail or track system 74, 76 to allow for proper alignment and mobility of the work-stops in relation to the cutting tool fence apparatus 12 with measuring ruler 54 and the flip stop component 52. However, the present invention is not limited to such an embodiment, and other embodiments can be used to practice the invention.

Figure 6:
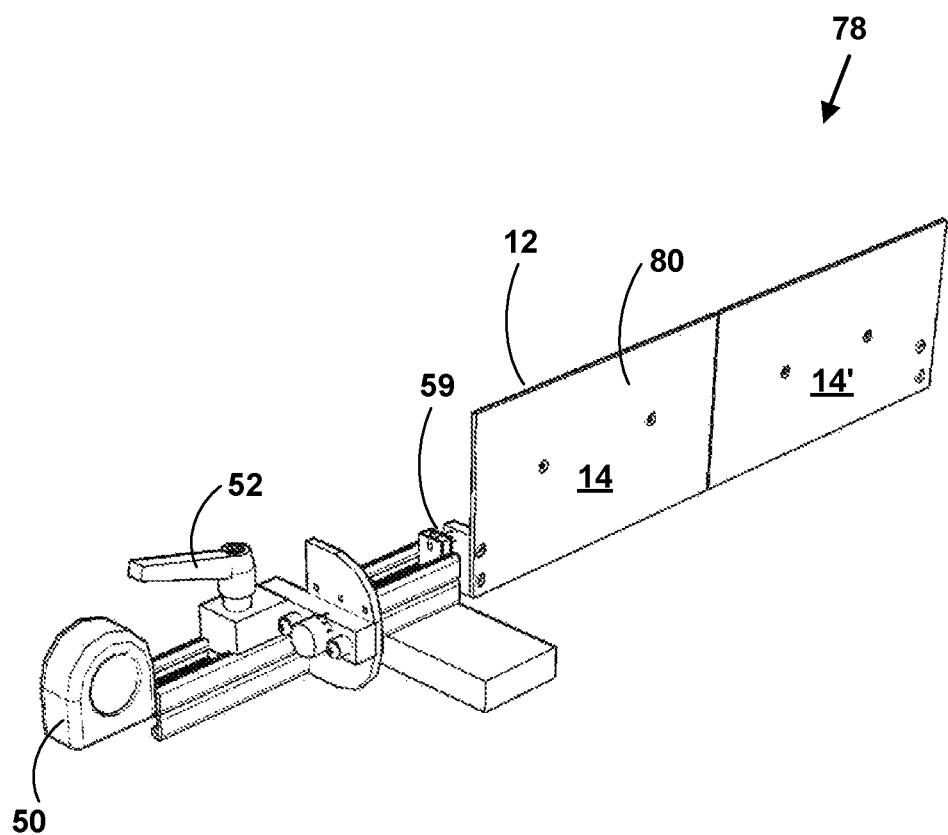
FIG. 6 is a block diagram illustrating the cutting tool fence apparatus with measuring ruler including a zero clearance fence apparatus.

FIG. 6 is a block diagram 78 illustrating the cutting tool fence apparatus 12 with measuring ruler 54 including a zero clearance fence apparatus 80.

Figure 7:
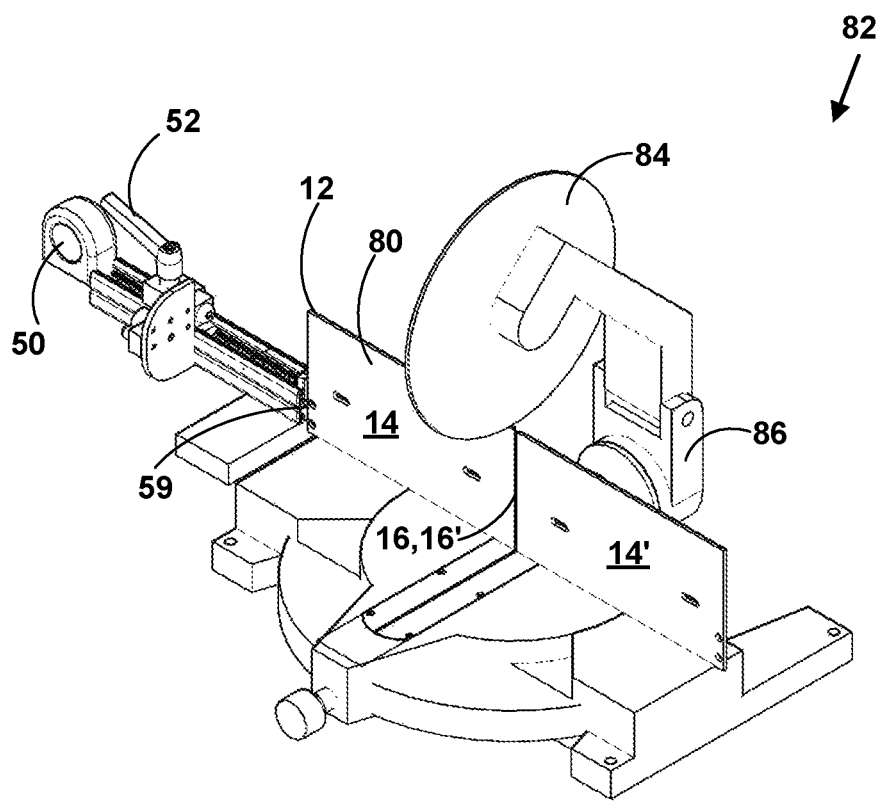
FIG. 7 is a block diagram illustrating the cutting tool fence apparatus without measuring ruler including a zero clearance fence apparatus with a cutting saw.

FIG. 7 is a block diagram 82 illustrating the cutting tool fence apparatus 12 without measuring ruler 54 including a zero clearance fence apparatus 80 with cutting saw.

A zero clearance fence gives precision to saw fences around a saw blade. A zero clearance fence includes the two fence components 14, 14'. The flat surfaces are beveled at one edge of both surfaces. The fences slide towards and away from the saw blade. The ability to slide allows the fences to always be right next to the saw blade at any miter angle cut for precision in the cut measurements. In one embodiment the zero clearance fence includes two fence components 14, 14' connected to one or more flip stop components 54 to provide a zero clearance fence with a precise measuring system with the tape measure 50 as described herein.

The zero clearance fence apparatus 80 includes a fence component 14 and a second fence component 14' with the beveled edges 16, 16' set a pre-determined distance apart to allow a saw blade 84 on the cutting saw 86 to make a safe cut on the piece of material.

Figure 8:
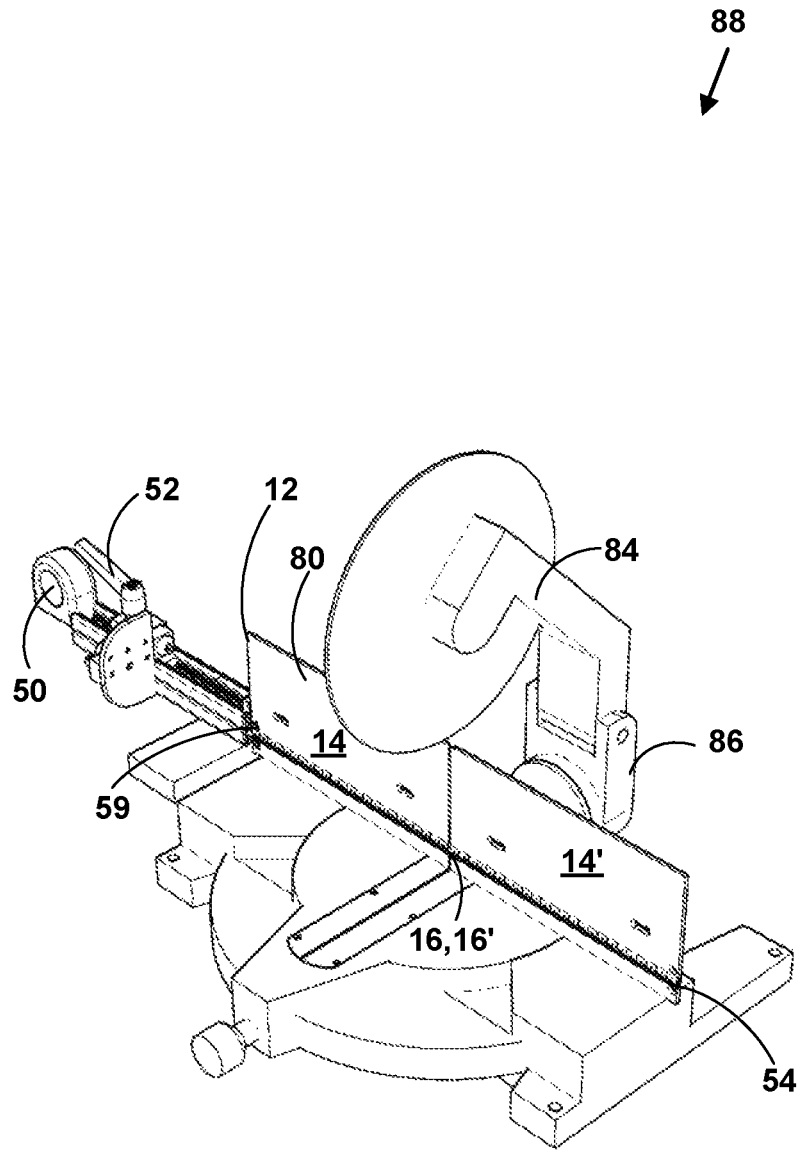
FIG. 8 is a block diagram illustrating the cutting tool fence apparatus with measuring ruler including a zero clearance fence apparatus with a cutting saw.

FIG. 8 is a block diagram 88 illustrating the cutting tool fence apparatus 12 with measuring ruler 54 including a zero clearance fence apparatus 12 with a cutting saw 86.

FIGS. 7 and 8 illustrate only one flip stop component 52. However, the present invention is not limited to such embodiments and other embodiments with a second flip stop component attached to second fence component 14' is also used to practice the invention.

In one embodiment, the cutting tool fence apparatus 12 with and/or without measuring ruler 54 is used as zero clearance fence included in U.S. Pat. No. 10,836,066, entitled "Zero Clearance Fence" that issued to Robert J. Suhling, the same inventor as the present application. However, the present invention is not limited to such an embodiment, and other embodiments can be used to practice the invention.

FIG. 8 is a block diagram 90 illustrating a flip stop component 52 used with the cutting tool fence apparatus 12 with measuring ruler 56.

Figure 9:
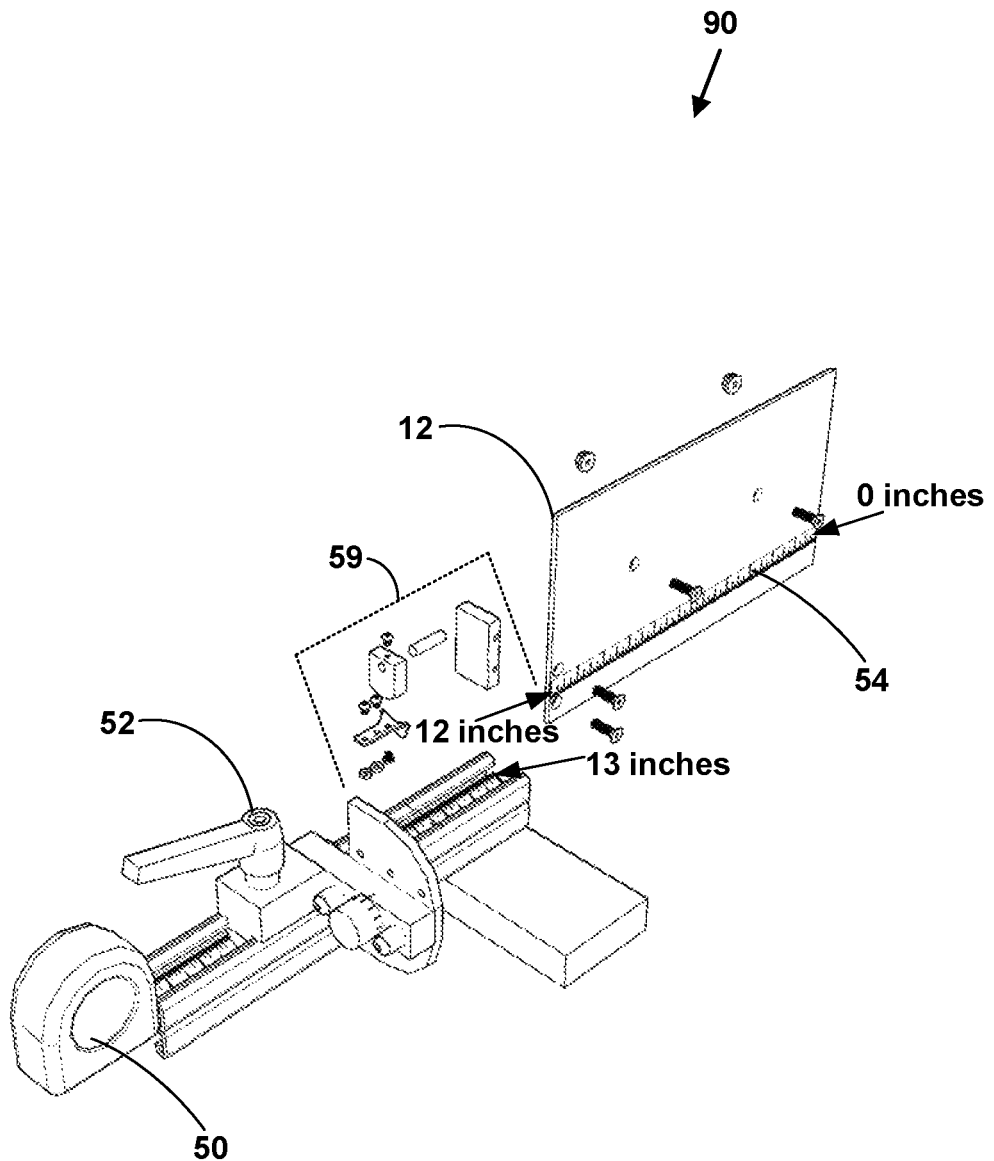
FIG. 9 is a block diagram illustrating a flip stop component used with the cutting tool fence apparatus with measuring ruler.

FIG. 9 illustrates the fence component 14 is twelve inches in length with the tape measure blade 48 starting at the thirteen inch mark with the tape measure blade 48 including the same scale as the measuring ruler 56.

Figure 10:
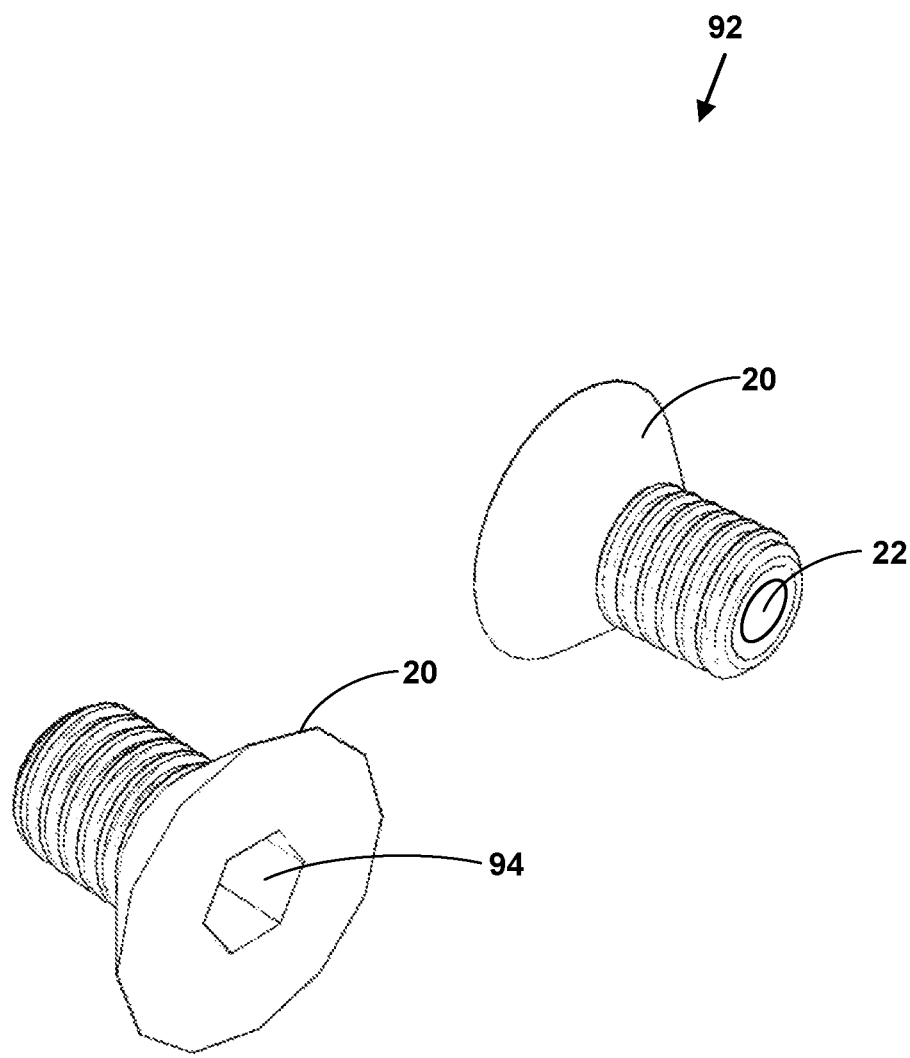
FIG. 10 is a block diagram illustrating an attachment means used with the cutting tool fence apparatus with measuring ruler.

FIG. 10 is a block diagram 90 illustrating an attachment means 20 used with the cutting tool fence apparatus 12 with measuring ruler 56.

FIG. 10 illustrates a front and back view with the attachments means 20 with a hollow central receptacle 22 precisely manufactured to accept a drill bit 24, hex-key head 92 including the hollow central receptacle 22.

Figure 11:
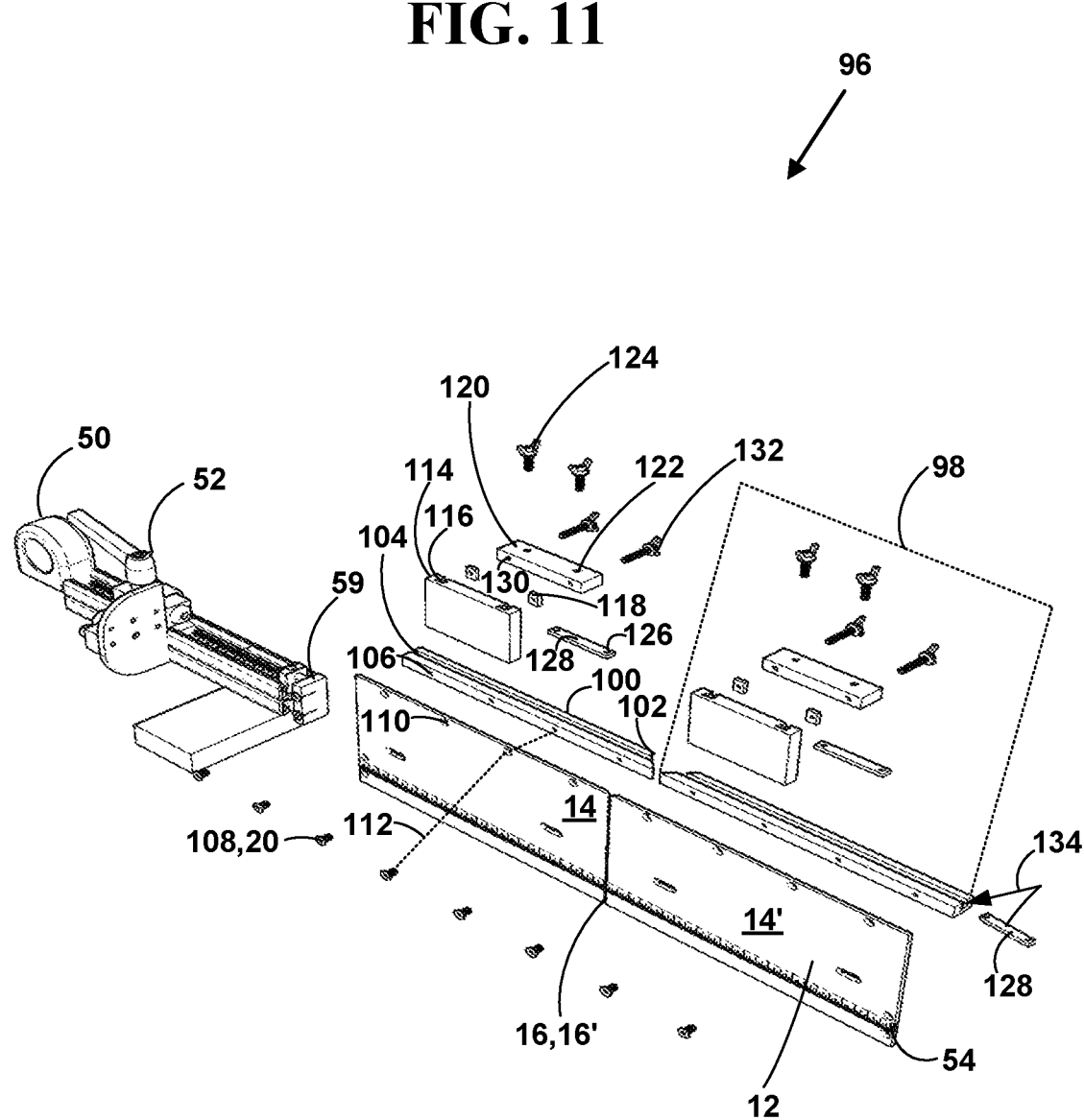
FIG. 11 is a block diagram illustrating a cutting tool fence apparatus with measuring ruler and exploded view of a moveable material stop component.

FIG. 11 is a block diagram 96 illustrating a cutting tool fence apparatus 12 with measuring ruler 54 and exploded view of a moveable material stop component 98.

In FIG. 11, the moveable material stop component 98 includes, but is not limited to a material stop connection rail 100. The material stop connection rail 100 provides additional support to the fence components 14, 14' to prevent warping and/or bending of the fence components 14, 14'. The material stop connection rail 100, including a first end with a beveled edge 102 and the edge further cut away with a pre-determined angle (e.g., about 45 degrees, etc.) 146 (FIG. 13) to allow a saw blade 84 on a cutting saw 86 to make a safe cut on a piece of material. The beveled edge 102 is an edge to allow a saw blade 84 on a cutting saw 86 to safely make a cut on a piece of material.

The material stop connection rail 100, includes a grooved receptacle 104 with groves in side surfaces of the grooved receptacle 104 to engage and allow other connection components (e.g., 128, etc.) of the moveable material stop component 98 to be moved back and forth horizontally along the fence component 14.

The moveable material stop component 98 further includes plural attachment receptacles 106 (four of which are illustrated) with plural material stop attachments means 108 (four of which are illustrated) to attach 112 the material stop connection rail 100 to a back surface of the fence component 14 of the cutting tool fence apparatus 12 via plural countersunk receptacles 110 (four of which are illustrated).

In one embodiment, the material stop attachment means 108 include, but are not limited to, the first attachment means 20, 20' including a screw and/or a bolt with a hollow central receptacle 22, 22' precisely manufactured to accept a drill bit 24, 24'. However, the present invention is not limited to such an embodiment and other embodiments type of attachment means may be used to practice the invention.

The moveable material stop component 98 further includes a vertical material stop component 114 which is placed upon a front surface of the fence component 14 to provide a component to securely hold a piece of material being cut. The vertical material stop component 114 includes plural receptacles 116 (two of which are illustrated) cut a pre-determined length (e.g., full length, half-length, etc.) in a back surface of the vertical material stop 114 for engaging and securely holding a threaded nut attachment means 118 and allow the vertical material stop component 114 in the moveable material stop 98 to be adjusted up and down vertically on the fence component 14 to securely hold a piece of material being cut.

In another embodiment, the plural receptacles 116 are threaded receptacles for securely holding plural threaded horizontal connection means 132. In such an embodiment, the threaded nut attachment means 118 is not used. However, the present invention is not limited to such and embodiment and other embodiments can be used to practice the invention.

The moveable material stop component 98 further includes a first horizontal material stop component 120 with plural first top receptacles 122 (two of which are illustrated) in a top surface of the horizontal material stop component 120 to accept plural first threaded bolt connection means 124 which connect into plural threaded receptacles 126 (two of which are illustrated) on a second horizontal material stop component 128 used to secure the movable material stop component 98 to a top surface of the fence component 14.

The second horizontal material stop component 128 engages groves on sides 134 of the grooved receptacle 104 allowing it to securely engage the grooved receptacle 104 and slide back and forth horizontally in the groves in the side surfaces of the grooved receptacle 104 securely within the material stop connection rail 100. The plural first threaded bolt connection means 124 which connects into plural threaded receptacles 126 on the second horizontal material stop component 128 do not extend through the second horizontal material stop component 128.

The first horizontal material stop component 120 further includes plural second side receptacles 130 (two of which are illustrated) in two sides surfaces of the first material stop component 120. The plural second side receptacles 130 are receptacles that are bored completely through side surfaces of the first horizontal material stop component 120 to accept plural threaded horizontal connection means 132 that rotate into threaded nut attachment means 118 on the vertical stop component 114.

In one embodiment, the plural second side receptacles 130 include a smooth interior surface. In another embodiment, the plural second side receptacles 130 included a threaded interior surface. However, the present invention in not limited to such an embodiment and other embodiments can be used to practice the invention.

In one embodiment, the plural first threaded bolt connection means 124 and the plural threaded horizontal connection means 132 include threaded bolts including a winged top with plural wings to allow easy tightening and loosening of the connections means 124, 132 to move the moveable material stop component 98 back and forth horizontally along the fence components 14, 14' to secure a piece of material 143 to be cut. However, the present invention is not limited to such an embodiment and other embodiments can be used to practice the invention.

Figure 12:
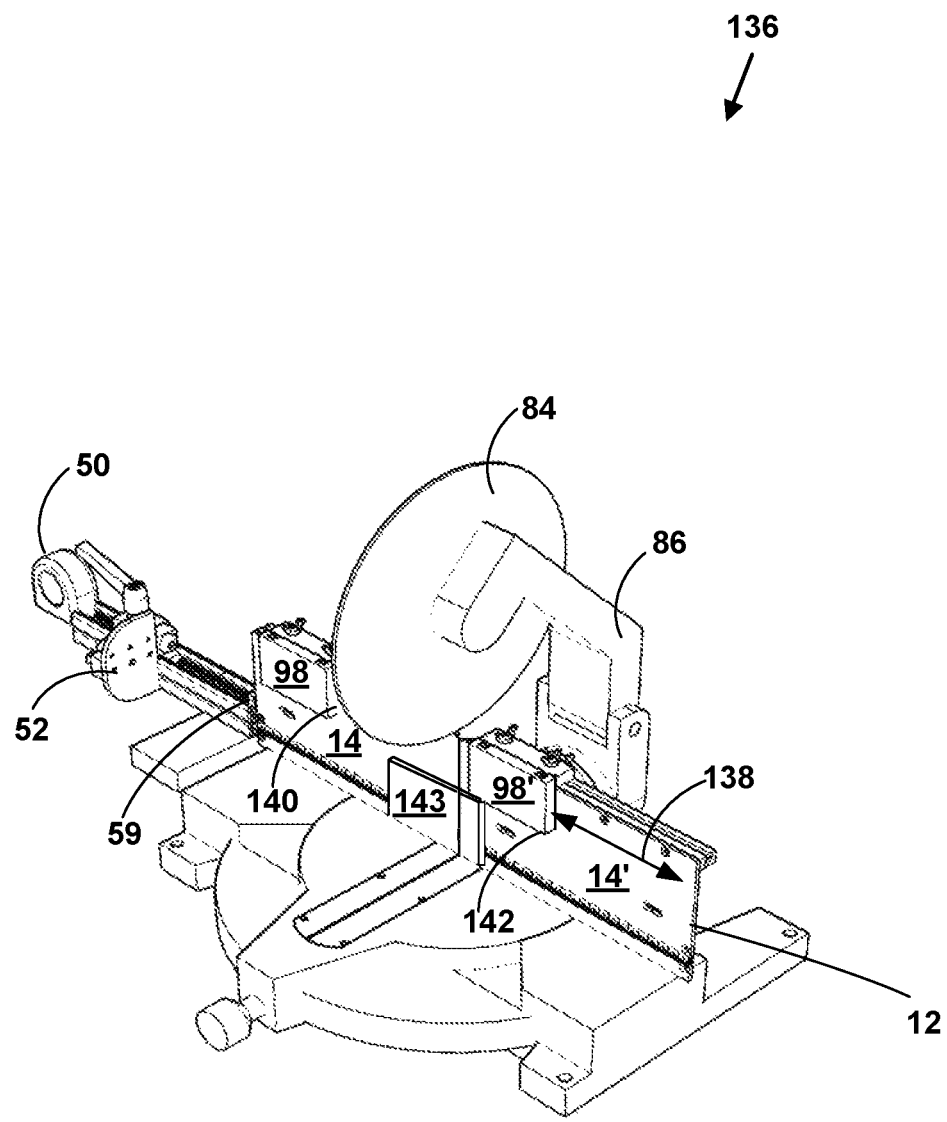
FIG. 12 is a block diagram illustrating the cutting tool fence apparatus with measuring ruler and moveable material stop component including a zero clearance fence apparatus with a cutting saw.

In the embodiment illustrated by FIG. 12 the moveable material stop component 98 is adjusted on the material stop connection rail 100 from a top and back surface of the fence components 14, 14'. However, the present invention is not limited to this embodiment and other embodiments may be used to practice the invention.

FIG. 12 is a block diagram 136 illustrating the cutting tool fence apparatus 12 with measuring ruler 54 and moveable material stop component 98, 98' including a zero clearance fence apparatus 14, 14' with a cutting saw 86.

In FIG. 12, moveable material stop components 98, 98' are moved horizontally 138 back and forth to new positions along the fence components 14, 14' of the cutting tool fence apparatus 12 by loosening and re-tightening connections means 124, 132 of the moveable material stop component 98, 98'.

The moveable material stop component 98 secures a piece of material 143 to be cut with a saw blade 84 on a saw 84 with a side surface 140 and/or a bottom surface 142 (illustrated in FIG. 12) of the movable material stop component 98.

FIGS. 11 and 12 illustrate two fence components 14, 14'. However, the present invention can also be practiced with one fence component 14.

Figure 13:
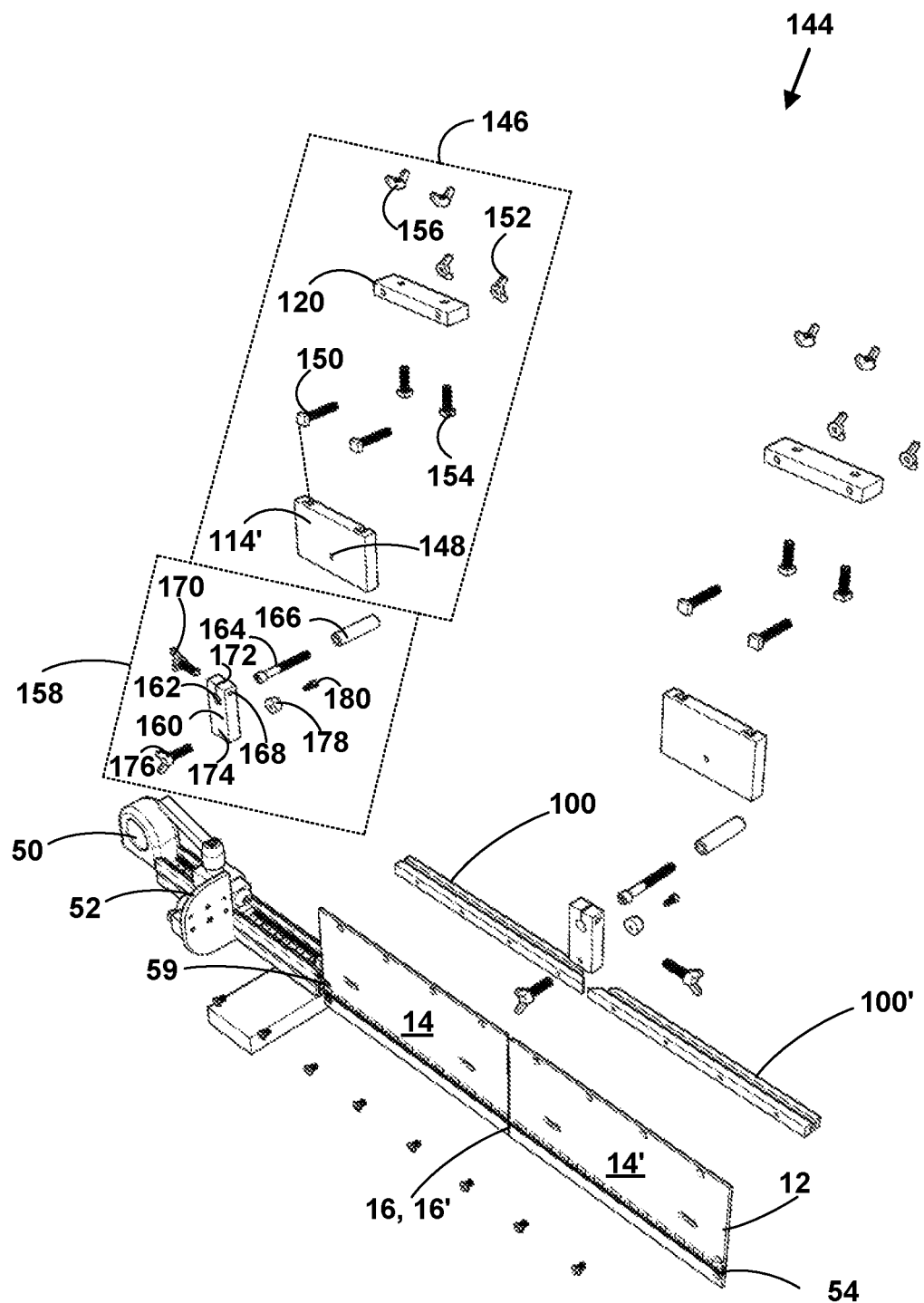
FIG. 13 is a block diagram illustrating an exploded view a cutting tool fence apparatus with measuring ruler and moveable stop component.

FIG. 13 is a block diagram 144 illustrating an exploded view of a cutting tool fence apparatus 12 with measuring ruler 54 and moveable stop component 146.

FIG. 13, illustrated another embodiment of the moveable stop component 146. In this embodiment, vertical material stop component 114' which is placed upon a front surface of the fence component 14 to provide a component to securely hold a piece of material being cut includes a second body component threaded receptacle 148 for accepting and securely connecting a second vertical material stop component 158 to further secure a piece of material being cut. The a second body component threaded receptacle 148 is placed on a lower portion of the vertical material stop component 114' to allow the second vertical material stop component 158 to extend to a lower level below the vertical stop component 114' to further securely hold materials being cut of different sizes and shapes (e.g., crown molding, baseboard, etc.). The vertical stop component 114' accepts plural first threaded bolt connection means with a square head 150. The plural first threaded bolt connection means with the square head 150 allows the vertical material stop component 114' in the moveable material stop 146 to be adjusted up and down vertically on the fence component 14 to securely hold a piece of material being cut. The plural first threaded bolt connection means with the square head 150 is tightened and loosened on the horizontal material stop component 120 with a first wing nut connection means 152. The horizontal material stop component 120 includes plural second threaded bolt connection means with the square head 154. The plural second threaded bolt connection means with the square head 154 is inserted in the grooved receptacle 104 of the material stop connection rail 100 allowing the moveable material stop component 146 to be moved back and forth horizontally along the fence component 14. The plural second threaded bolt connection means with the square head 154 is tightened and loosened on the horizontal material stop component 120 with a second wing nut connection means 156. In this embodiment, the second horizontal material stop component 128 is not used. However, the present invention is not limited to such an embodiment and more fewer and other types of components can be used to practice the invention.

In FIG. 13, the second vertical material stop component 158 including a second vertical stop body component 160 with a second body component threaded receptacle 162 bored through a first portion of a front and back surfaces of the second vertical stop body component 160 for accepting a second body component connection means 164 including a threaded bolt with a hex head that is rotated into a second body component threaded receptacle 148 in the first vertical material stop component 114' to connect the second vertical material stop component 158 to the first vertical material stop component 114'. The second body component connection means 164 including a hollow spacer component 166 to protect the threads on the second body component connection means 164 and providing additional stability to the second vertical stop body component 158. The hollow spacer component 166 allowing the second vertical stop body component 160 to slide horizontally in and out along the hollow spacer component 166 and allowing the second vertical stop body component 160 to accept and securely hold materials to be cut of varying thickness to be cut. The second vertical material stop component 158 further including a third threaded body component receptacle 168 bored through two side surfaces of the second vertical stop body component 160 for accepting a third body component connections means 170 including a threaded bolt with the winged head to tighten and loosen the second vertical stop body component to slide it horizontally in and out along the hollow spacer component 166 allowing the second vertical stop body component 160 to accept and securely hold materials to be cut of varying thickness to be cut. The second vertical material stop component 158 further including a vertical linear receptacle 172 allowing third body component connections means 170 including the threaded bolt with the winged head to compress a portion of the second vertical stop body component 160 to securely tighten it on a piece of material to be cut. The second vertical material stop component 158 further including a fourth threaded body component receptacle 174 bored through a second portion of the front and back surfaces of the second vertical stop body component 160 for accepting a fourth body component connection means 176 including a threaded bolt with the winged head to tightened and loosen the second vertical stop body component 160 on the piece of material being cut. The fourth body component connection means 176 engaging a flexible grommet means 180 for securing the piece of material being cut with pressure from tightening the fourth body component connection means 176. The fourth body component connection means 176 including a hollow end for engaging a fifth body connection means 180 for securing the flexible grommet means 178 to the fourth body component connection means 176.

However, the present invention is not limited to such an embodiment and more, fewer and other types of components can be used to practice the invention.

Figure 14:
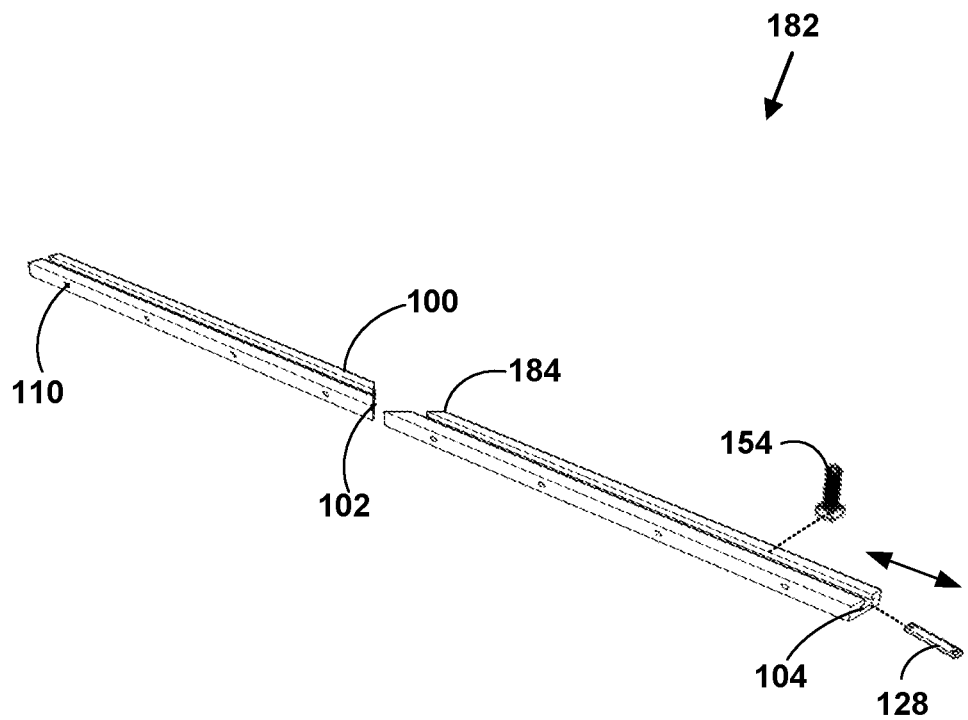
FIG. 14 is a block diagram illustrating additional details of a material stop connection rail.

FIG. 14 is a 182 block diagram illustrating additional details of a material stop connection rail 100.

In FIG. 14, additional details of the grooved receptacle 104 and the pre-determined angle cut back angle 184 are illustrated including one second horizontal material stop component 128 and one second threaded bolt connection means with the square head 154.

Figure 15:
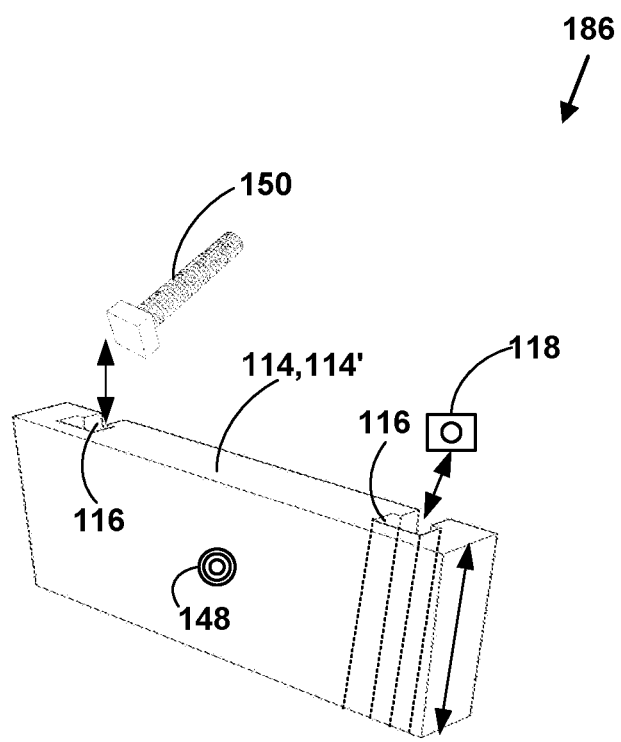
FIG. 15 is a block diagram illustrating additional details of a first vertical material stop component of a moveable material stop component.

FIG. 15 is a block diagram 186 illustrating additional details of a first vertical material stop component 114, 114' of a moveable material stop component 98, 158.

In FIG. 15, additional details of the plural receptacles 116 (two of which are illustrated) for engaging and securely holding the threaded nut attachment means 118 (one of which is illustrated), the first threaded bolt connection means with the square head 150 (one of which is illustrated) and threaded receptacle 148 in the first vertical material stop component 114, 114' of a moveable material stop component 98, 158.

Figure 16:
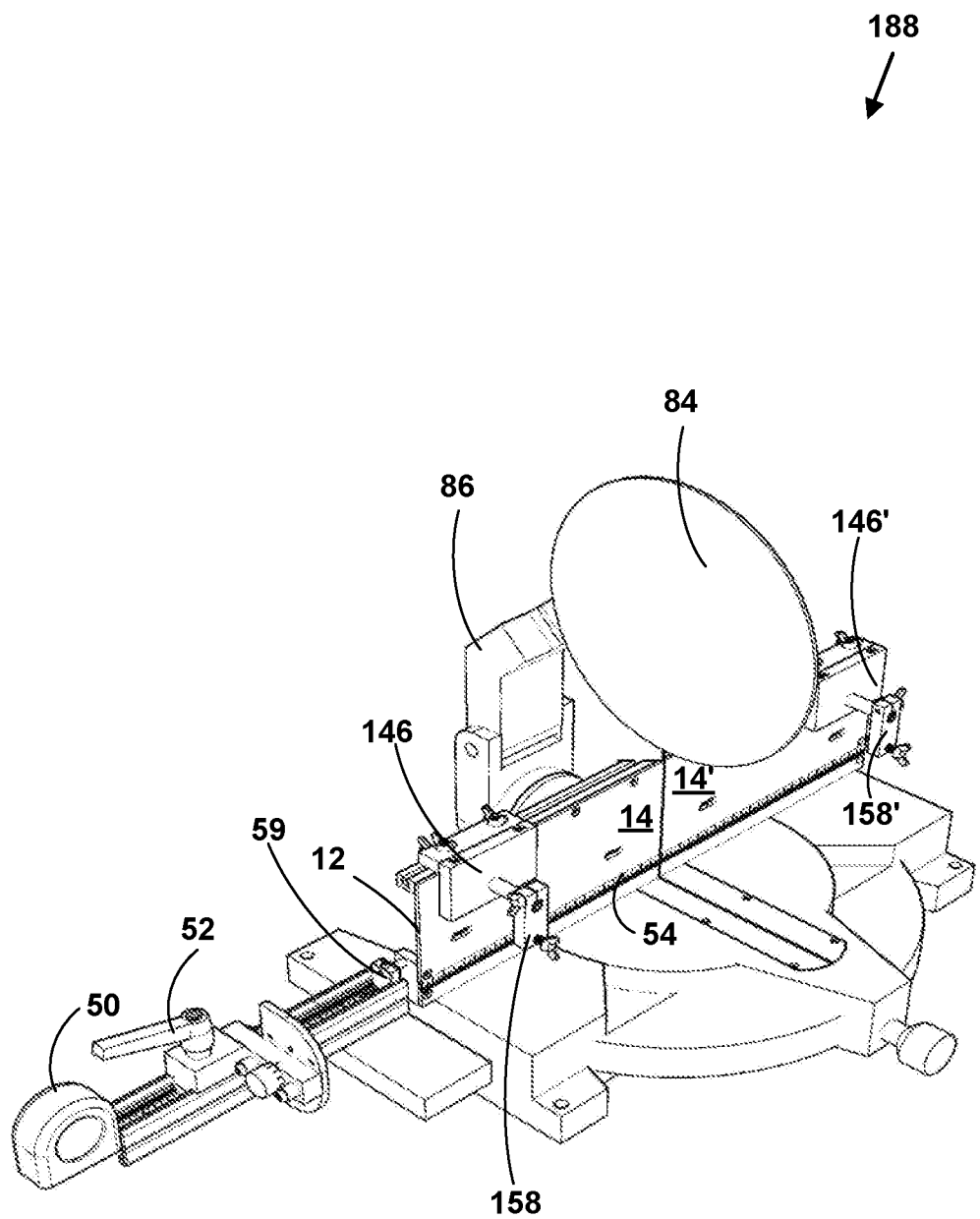
FIG. 16 is a block diagram illustrating a cutting tool fence apparatus with measuring ruler and a moveable material stop component.

FIG. 16 is a block diagram 188 illustrating a cutting tool fence apparatus 12 with measuring ruler 54 and moveable material stop component 146, 146', 158, 158'.

In the embodiment illustrated by FIG. 16 the moveable material stop component 98,158 is adjusted on the material stop connection rail 100 from the back, top and front surface of the fence components 14, 14'. However, the present invention is not limited to such an embodiment and other embodiments can be used to practice the invention.

Figure 17:
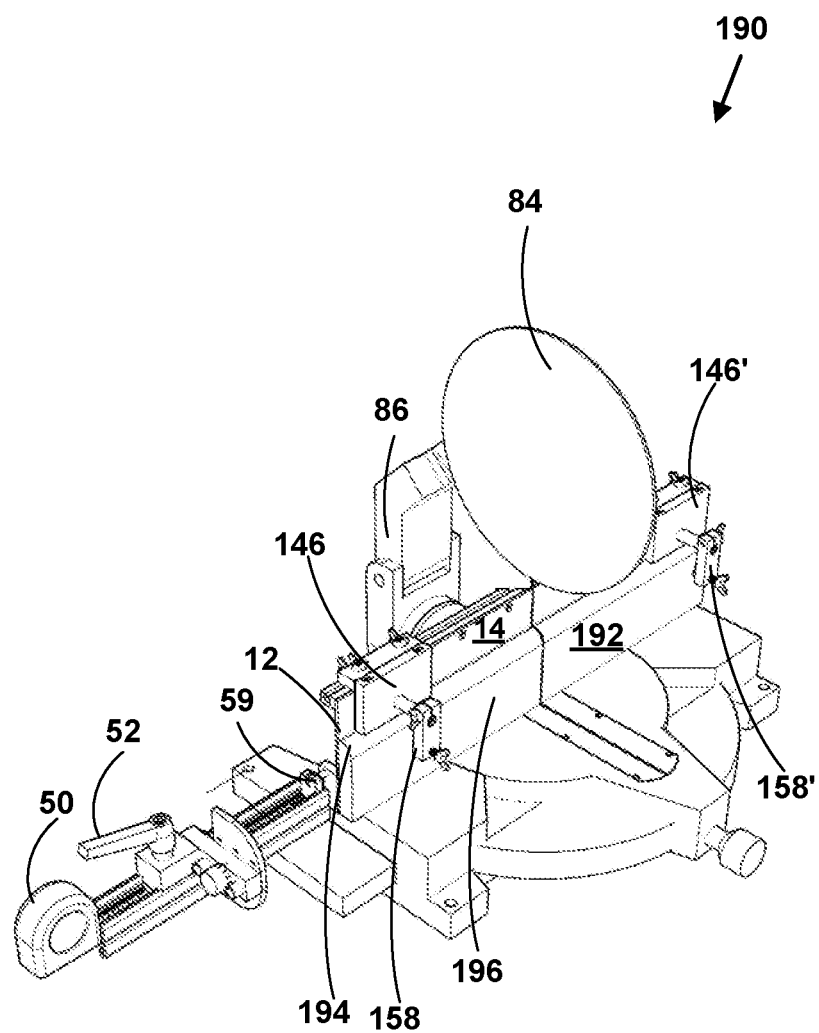
FIG. 17 is a block diagram illustrating a cutting tool fence apparatus with measuring ruler and a moveable material stop component with a first flat piece of material to be cut.

FIG. 17 is a block diagram 190 illustrating a cutting tool fence apparatus 12 with measuring ruler 54 and a moveable material stop component 146, 146', 158, 158' with a first flat piece of material 192 to be cut.

In FIG. 17, the first piece of sloped material 192 is illustrated as first type of crown molding and/or baseboard.

A crown molding includes a decorative element that is installed where a wall meets a ceiling. A baseboard includes a decorative element, but it sits at a bottom of a wall.

In FIG. 17, a bottom surface of the movable material stop component 146, 146' securely holds a top surface 194 of the first flat piece of the material 192 to be cut and a side surface of the moveable material stop component 158, 158' securely holds a side surface 196 of the first flat piece of material 192 to be cut.

In FIG. 17, moveable material stop component 158, 158' is moved outward a first distance on the hollow spacer component 166 to securely hold the side surface 206 of the first flat piece of material 192 to be cut.

Figure 18:
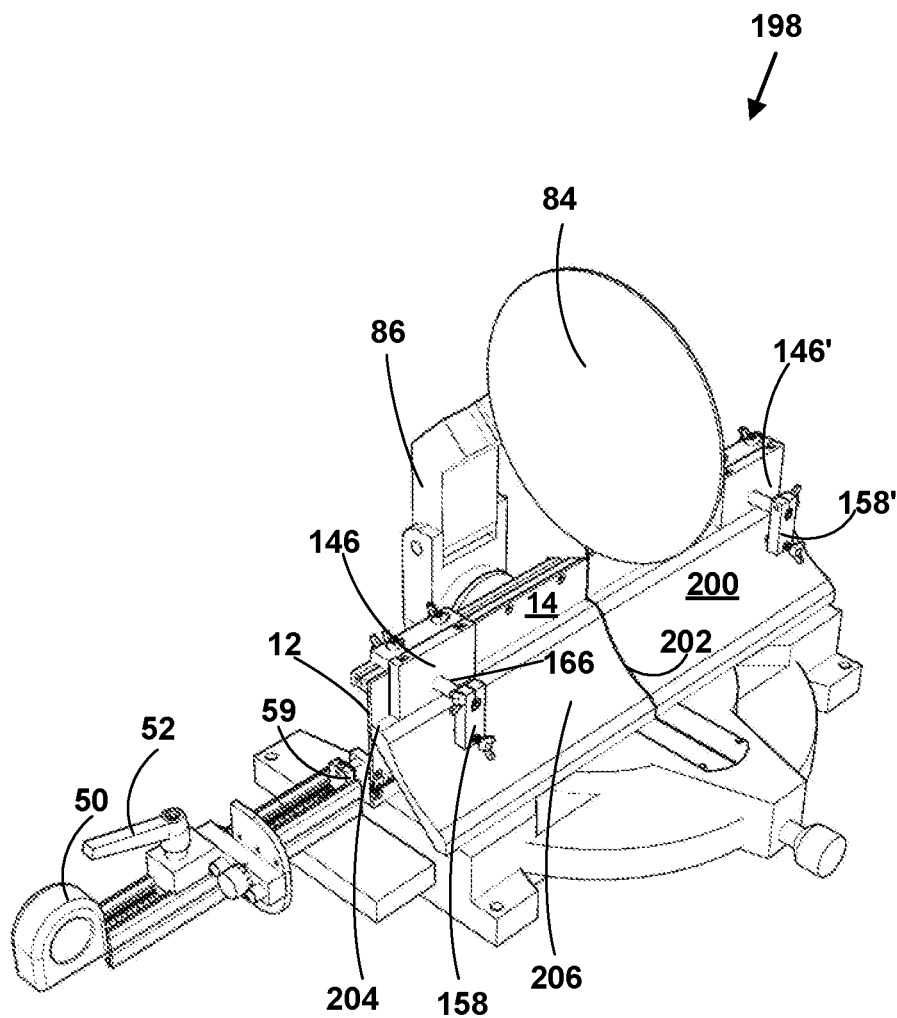
FIG. 18 is a block diagram 194 illustrating a cutting tool fence apparatus with measuring ruler and a moveable material stop component with a second piece of material to be cut.

FIG. 18 is a block diagram 198 illustrating a cutting tool fence apparatus 12 with measuring ruler 54 and a moveable material stop component 146, 146', 158, 158' with a second piece of material 200 to be cut.

In FIG. 18, the second piece of sloped material 200 is illustrated as second type of crown molding that requires cutting along a slopped surface 202.

In FIG. 18, a bottom surface of the movable material stop component 146, 146' securely holds a top surface 204 of the second piece of the material 200 to be cut and a side surface of the moveable material stop component 158, 158' securely holds a side surface 206 of the second piece of material 200 to be cut.

In FIG. 18, moveable material stop component 158, 158' is moved outward a second distance larger distance that the first distance on the hollow spacer component 166 to securely hold the side surface 206 of the second piece of material 200 to be cut.

Figure 19:
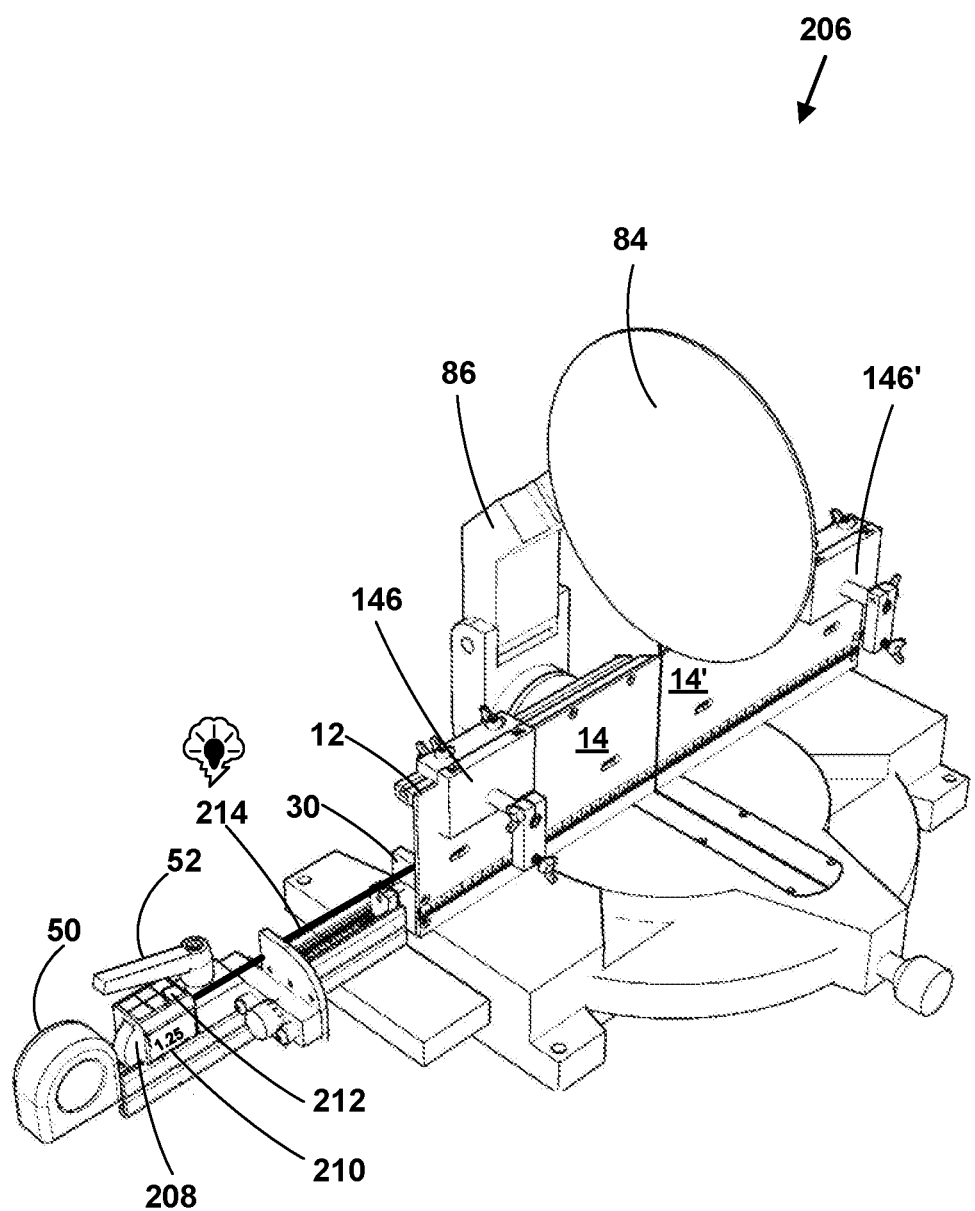
FIG. 19 is a block diagram illustrating a cutting tool fence apparatus with measuring ruler and a moveable material stop component and a laser measuring component attached to the flip stop component.

FIG. 19 is a block diagram 206 illustrating a cutting tool fence apparatus 12 with measuring ruler 54, and a moveable material stop component 146, 146', 158, 158' and a laser measuring component 208 attached to the flip stop component 52.

The laser measuring component 208 includes, but is not limited to, a digital display 210, and a push button interface control 212 providing on/off, and selection of different measuring system (e.g., metric, US, etc.). The laser measuring system 212 is powered by one or more batteries. However, the present invention in not limited to such an embodiment and other embodiments with more or fewer components can be used to practice the invention.

The laser measuring component 208 includes, but is not limited to, pulsing a laser beam 214 and measuring a return time of the laser light back to a light detector in the laser measuring component 208. A high speed processor then calculates the distance between the laser and the object it was pointing at based upon the measured return time to precisely measure distances down to about a millimeter (mm) or about 0.04 inches.

In one embodiment, the laser measuring system includes a digital display 210 for displaying measured distances as the laser measuring component 208 is moved back and forth away from and towards the fence components 14, 14'.

In one embodiment, the laser measuring component 208 is configured to send the laser beam 214 to hit a front surface the fence attachment component 30 as part of the flip stop attachment set 59 attached to the fence component 14. The laser measuring component 208 allowing continuous accurate measurements of materials placed against the front surface on the fence component 14 with the laser beam 214 continuing to the flip stop component 52 as the laser measuring component 208 is moved horizontally away from the fence component 14 along the stand for the cutting saw 84. The exact location of laser measuring component 208 is determined and the laser measurements are adjusted in a manner similar to the adjusts made with the cutting blade 48 of the tape measure 50 push button interface control 212 (e.g., the fence component 14 is twelve inches in length (e.g., FIG. 9) with the tape measure blade 48 starting at the thirteen inch mark and the laser measuring component placed behind the flip stop component 52 which is six inches in length (FIG. 19), so all laser measurements 214 would be adjusted by eighteen inches). The laser beam 214 is adjustable via push button interface control 212 to be projected out a left side and/or a right side when the flip stop component 52 is flipped to the left and/or the right. However, the present invention is not limited to such an embodiment and other embodiments can be used to practice the invention.

In one embodiment, the laser measuring component 208 is used with the tape measure 50 to verify accurate measurements of materials being cut. In another embodiment, the laser measuring component 208 is used instead of the tape measure 50 to provide accurate measurements for materials being cut. However, the present invention is not limited to such embodiments and other embodiments can be used to practice the invention.

In one embodiment, the laser measuring component 208 includes a laser measuring component with a precision encoder wheel. Encoder measuring wheels allow rotary encoders to measure linear distance. The laser measuring component includes encoded measuring wheels in both US units (e.g., inches, feet, etc.) and metric circumferences. However, the present invention is not limited to such embodiments and other embodiments can be used to practice the invention.

FIGS. 11-19 illustrate a moveable material stop 98, 158 that can be moved back and forth horizontally, in and out horizontally and up and down vertically, to securely hold materials over varying widths and heights used with a flip-stop 52 on a zero-clearance fence 14, 14'.

Various component of the cutting tool fence apparatus 12 with measuring ruler 54 and moveable material stop components 98 are individually manufactured, machined, 3D printed by a 3D printer, extruded and/or pultruded including metal, rubber, wood, plastic and/or composite materials.

However, the present invention is not limited to such an embodiment and other embodiments can be used to practice the invention.

"Manufacturing" includes the process of making items from raw materials. "Machining" includes various processes in which a piece of raw material is cut into a desired final shape and size by a controlled material-removal process.

A "3D printer" includes 3D printing or "Additive manufacturing." 3D printing is a process of making a three-dimensional solid object of virtually any shape from a digital model. 3D printing is achieved using an "additive process," where successive layers of material (e.g., metal, plastic, etc.) are laid down in different shapes. 3D printing is also considered distinct from traditional manufacturing and/or machining techniques, which mostly rely on the removal of material by methods such as cutting or drilling and are "subtractire" processes.

"Extrusion" is a manufacturing process where a material such as aluminum, etc. is pushed and/or drawn through a die to create long objects of a fixed cross-section. Hollow sections are usually extruded by placing a pin or mandrel in the die. Extrusion may be continuous (e.g., producing indefinitely long material) or semi-continuous (e.g., repeatedly producing many shorter pieces). Some extruded materials are hot drawn and others may be cold drawn.

The feedstock may be forced through the die by various methods: by an auger, which can be single or twin screw, powered by an electric motor; by a ram, driven by hydraulic pressure, oil pressure or in other specialized processes such as rollers inside a perforated drum for the production of many simultaneous streams of material. "Pultruson" is a manufacturing process for producing continuous lengths of materials. Pultruson raw materials include metals such as aluminum, etc. or a liquid resin mixture (e.g., containing resin, fillers and specialized additives) and reinforcing fibers (e.g., fiberglass, composite materials, etc.). The process involves pulling these raw materials (rather than pushing as is the case in extrusion) through a heated steel forming die using a continuous pulling device. The reinforcement materials are in continuous forms such as rolls of fiberglass mat or doffs of fiberglass roving. As the reinforcements are saturated with the resin mixture in the resin impregnator and pulled through the die, the gelation (or hardening) of the resin is initiated by the heat from the die and a rigid, cured profile is formed that corresponds to the shape of the die.

There are also protruded laminates. Most pultruded laminates are formed using rovings aligned down the major axis of the part. Various continuous strand mats, fabrics (e.g., braided, woven and knitted), and texturized or bulked rovings are used to obtain strength in the cross axis or transverse direction.

The pultruson process is normally continuous and highly automated. Reinforcement materials, such as roving, mat or fabrics, are positioned in a specific location using preforming shapers or guides to form a pultruson. The reinforcements are drawn through a resin bath where the material is thoroughly coated or impregnated with a liquid thermosetting resin. The resin-saturated reinforcements enter a heated metal pultruson die. The dimensions and shape of the die define the finished part being fabricated. Inside the metal die, heat is transferred initiated by precise temperature control to the reinforcements and liquid resin. The heat energy activates the curing or polymerization of the thermoset resin changing it from a liquid to a solid. The solid laminate emerges from the pultruson die to the exact shape of the die cavity. The laminate solidifies when cooled and it is continuously pulled through the pultruson machine and cut to the desired length. The process is driven by a system of caterpillar or tandem pullers located between the die exit and the cut-off mechanism.

A "composite material" is a combination of two materials with different physical and chemical properties. The different physical or chemical properties of the two materials remain separate and distinct at the macroscopic or microscopic scale within the finished structure. Common polymer-based composite materials, include at least two parts, a substrate (e.g., fibers, etc.) and a resin.

When they are combined they create a material which is specialized material to do a certain job, for instance to become stronger, lighter or resistant to electricity. Composite materials also improve strength and stiffness of the materials. One reason for their use over traditional materials is because they improve the properties of their base materials and are applicable in many situations.

The composite materials include, but are not limited to, "Fiber-reinforced polymers" (FRP) including thermoplastic composites, short fiber thermoplastics, long fiber thermoplastics or long fiber-reinforced thermoplastics. There are numerous thermoset composites, but advanced systems usually incorporate aramid fiber and carbon fiber in an epoxy resin matrix. The composite materials also include carbon/carbon composite materials with carbon fibers and a silicon carbide matrix.

A cutting tool fence apparatus with a flip stop connector, measuring ruler and moveable material stop is presented within. The cutting tool fence apparatus includes a measuring ruler imprinted on the fence itself to provide a precise measuring system. The fence includes a connection apparatus to connect the fence to a flip-stop. The flip-stop allows a tape measure to be used to provide a precise measurements with a measuring ruler include on the fence. The fence is also used as a zero-clearance fence with a moveable material stop component that can be adjusted both vertically and horizontally to securely hold a piece of material for cutting.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa The claims should not be read as limited to the described order or elements unless stated to that effect. In addition, use of the term "means" in any claim is intended to invoke 35 U.S.C. § 112, paragraph 6, and any claim without the word "means" is not so intended. Therefore, all embodiments that come within the scope and spirit of the following claims and equivalents thereto are claimed as the invention.

I claim:

1. A cutting tool fence apparatus with measuring, comprising:
    a fence component with three edges and one beveled edge, the beveled edge allowing a saw blade on a cutting saw to make a cut on a piece of material;
    one or more first countersunk receptacles for attaching the fence component to the stand for the cutting saw, the one or more first countersunk receptacles allows the fence component to be adjusted on the stand for the cutting saw with a desired precision;
    one or more first attachment means to attach the fence component to the stand for the cutting saw, the one or more first attachment means including a hollow central receptacle manufactured to accept a drill bit,
    the hollow central receptacle ensuring the drill bit will drill a circular guide hole in the stand for the cutting saw and prevent the guide hole being drilled from being other than a circular shaped as it is drilled;
    one or more second countersunk receptacles on the fence component to attach the fence component to a fence attachment component;
    the fence attachment component including one or more second hollow receptacles for accepting one or more second attachment means to attach the fence attachment component to the fence component;
    a cylinder shaped magnet component allowing the fence attachment component to be temporarily attachable and removable, magnetically, to a tape measure connection component connected to a tape measure,
    the tape measure connection component including:
    a first hollow receptacle in a side surface of the tape measure connection component to accept a portion the cylinder shaped magnet component,
    a second hollow receptacle on a top surface of the tape measure connection component intersecting a top portion of the first hollow receptacle,
    the second hollow receptacle accepting a first set screw to engage and hold a portion of the cylinder shaped magnet component to securely keep the cylinder shaped magnet component in place within the first hollow receptacle of the tape measure connection component, a third hollow receptacle on a bottom surface of the tape measure connection component accepting a second set screw for connecting a tape measure hook component on a blade component of the tape measure, wherein the tape measure connection component is used within a flip stop component;

a measuring ruler on a front surface of the fence component with the same measuring markings on the blade of the tape measure allowing measurements of materials placed against the front surface on the fence component continuing to the blade of the tape measure as the flip stop component including the tape measure is moved horizontally away from the fence component along the stand for the cutting saw, the tape measure connected magnetically to the fence component via the tape measure connection component; and a moveable material stop component attachable to and removable from, the fence component, dynamically moveable back and forth horizontally along a front surface of the fence component to a plurality of different locations for securely holding the piece of material allowing for safe cutting with the saw blade on the cutting saw, the movable material stop component including one or two vertical material stop components for securely holding the piece of material on two surfaces against the fence component allowing for safe cutting with the saw blade on the cutting saw.

2. The cutting tool fence apparatus with measuring ruler of claim 1, wherein the fence component comprises a metal component including a steel, stainless steel or aluminum, metal component.

3. The cutting tool fence apparatus with measuring ruler of claim 1, wherein the measuring ruler is engraved on, etched on, included on a sticker or is projected on, with a projection component the fence component.

4. The cutting tool fence apparatus with measuring ruler of claim 1, wherein the one or more first attachment means include a screw, bolt, pin or rivet.

5. The cutting tool fence apparatus with measuring ruler of claim 4, wherein the one or more first attachment means include a hex-key head including the hollow central receptacle.

6. The cutting tool fence apparatus with measuring ruler of claim 1, wherein flip stop attachment component includes a magnetic metal.

7. The cutting tool fence apparatus with measuring ruler of claim 1, wherein the fence component is manufactured from a larger piece of metal with a process taking into account the tensile and compressive forces in the larger piece of metal around the fence component, preventing the fence component from being deformed by an equilibrium process after manufacturing so the resulting fence component is manufactured with precise edges and precise ninety degree corners.

8. The cutting tool fence apparatus with measuring ruler of claim 1, wherein the one or more first attachment means include hollow central receptacles of varying sizes to accept drill bits of varying sizes to drill guide holes of varying sizes.

9. The cutting tool fence apparatus with measuring ruler of claim 1, wherein the stand for the cutting saw includes a channel-based strut, rail or track system to allow for proper alignment and mobility of the flip stop component in relation to the cutting tool fence apparatus with measuring ruler.

10. The cutting tool fence apparatus with measuring ruler of claim 1, wherein includes a second fence component used with the first component creating a zero clearance fence component.

11. The cutting tool fence apparatus with measuring ruler of claim 10, wherein the beveled edges of the first fence component and second fence component are set a pre-determined distance apart to allow a saw blade on the cutting saw to make a safe cut on the piece of material.

12. The cutting tool fence apparatus with measuring ruler of claim 1, wherein the moveable material stop component comprises:

a material stop connection rail including a first end with a beveled edge and the beveled edge further cut away from the material stop connection rail with a pre-determined angle to allow the saw blade on the cutting saw to make a safe cut on a piece of material, the material stop connection rail including a grooved receptacle with groves in side surfaces of the grooved receptacle to engage and allow a second horizontal material stop of the moveable material stop component to be moved back and forth horizontally along the fence component within the material stop connection rail;

a plurality of countersunk attachment receptacles in the material stop connection rail and a plurality of material stop attachments means to attach the material stop connection rail to a back surface of the fence component via the plurality of countersunk attachment receptacles;

a first vertical material stop component which is placed upon a front surface of the fence component to provide a component to securely hold the piece of material being cut, the first vertical material stop component including a plurality of receptacles cut a pre-determined length in a back surface of the first vertical material stop component for engaging and securely holding a threaded bolt or a threaded nut attachment means and allowing the vertical material stop to be adjusted up and down vertically on the fence component;

a first horizontal material stop component with a plurality of first top receptacles in a top surface of the horizontal material stop component to accept a plurality of first threaded bolt connection means which connect into a plurality threaded receptacles on the second horizontal material stop component for securing the movable material stop component to a top surface of the fence component on a top surface of the material stop connection rail;

the first horizontal material stop component further including plural second side receptacles in two sides surfaces of the first material stop component, the plurality of plural second side receptacles include receptacles bored completely through the two side surfaces of the first horizontal material stop component to accept the plurality of threaded horizontal connection means that rotate into the plurality of threaded nut attachment means on the vertical stop component; and the second horizontal material stop component engaging groves on sides of the grooved receptacle allowing the second horizontal material stop component to securely engage the grooved receptacle and slide back and forth horizontally within the groves in the side surfaces of the grooved receptacle.

13. The cutting tool fence apparatus with measuring ruler of claim 12, further comprising:

a second vertical material stop component including:

a second vertical stop body component with a second body component threaded receptacle bored through a first portion of a front and back surfaces of the second vertical stop body component for accepting a second body component connection means including a threaded bolt with a hex head that is rotated into second body component threaded receptacle in the first vertical material stop component to connect the second vertical material stop component to the first vertical material stop component;

second body component connection means including a hollow spacer component to protect the threads on the second body component connection means, and providing additional stability to the second vertical stop body component, the hollow spacer component allowing the second vertical stop body component to slide horizontally in and out along the hollow spacer component and allowing the second vertical stop body component to accept and securely hold materials to be cut of varying thickness to be cut;

a third threaded body component receptacle bored through two side surfaces of the second vertical stop body component for accepting a third body component connections means including a threaded bolt with the winged head to tighten and loosen the second vertical stop body component to slide it horizontally in and out along the hollow spacer component allowing the second vertical stop body component to accept and securely hold materials to be cut of varying thickness to be cut, a vertical linear receptacle allowing third body component connections means including the threaded bolt with the winged head to compress a portion of the second vertical stop body component to securely tighten it on a piece of material to be cut;

a fourth threaded body component receptacle bored through a second portion of the front and back surfaces of the second vertical stop body component for accepting a fourth body component connection means including a threaded bolt with the winged head to tightened and loosen the second vertical stop body component on the piece of material being cut;

the fourth body component connection means engaging a flexible grommet means for securing the piece of material being cut with pressure from tightening the fourth body component connection means; and the fourth body component connection means including a hollow end for engaging a fifth body connection means for securing the flexible grommet means to the fourth body component connection means.

14. The cutting tool fence apparatus with measuring ruler of claim 1, further comprising:

a laser measuring component;

the laser measuring component connected with a laser beam to the fence attachment component, the laser measuring component providing measurements of materials placed against the front surface on the fence component.

15. A cutting tool fence apparatus with measuring ruler, comprising in combination:

a fence component with three edges and one beveled edge, the beveled edge allowing a saw blade on a cutting saw to make a cut on a piece of material;

one or more first countersunk receptacles for attaching the fence component to the stand for the cutting saw, the one or more first countersunk receptacles allows the fence component to be adjusted on the stand for the cutting saw with a desired precision;

one or more first attachment means to attach the fence component to the stand for the cutting saw, the one or more first attachment means including a hollow central receptacle manufactured to accept a drill bit, the hollow central receptacle ensuring the drill bit will drill a circular guide hole in the stand for the cutting saw and prevent the guide hole being drilled from being other than a circular shaped as it is drilled;

one or more second countersunk receptacles on the fence component to attach the fence component to a fence attachment component;

the fence attachment component including one or more second hollow receptacles for accepting one or more second attachment means to attach the flip step fence attachment component to the fence component;

a cylinder shaped magnet component allowing the fence attachment component to be temporarily attachable and removable, magnetically, to a tape measure connection component connected to a tape measure, the tape measure connection component including:

a first hollow receptacle in a side surface of the tape measure connection component to accept a portion the cylinder shaped magnet component, a second hollow receptacle on a top surface of the tape measure connection component intersecting a top portion of the first hollow receptacle, the second hollow receptacle accepting a first set screw to engage and hold a portion of the cylinder shaped magnet component to securely keep the cylinder shaped magnet component in place within the first hollow receptacle of the tape measure connection component, a third hollow receptacle on a bottom surface of the tape measure connection component accepting a second set screw for connecting a tape measure hook component on a blade component of the tape measure, wherein the tape measure connection component is used within a flip stop component, the tape measure connected magnetically to fence component via the tape measure connection component;

a measuring ruler of a pre-determined length on a front surface of the fence component with the same measuring markings on the blade of the tape measure, the measuring ruler insertable and removable from a slot on the fence component to change measuring systems; and the tape measure including:

the tape measure hook component removed, a portion of the blade removed equivalent to the pre-determined length of the measuring ruler on the fence component, the tape measure connection component attached to the tape measure hook component, the tape measure hook reattached at a new end of the blade of the tape measure resulting after the portion of the blade was removed, the tape measure allowing continuous accurate measurements of materials placed against the front surface on the fence component with the measuring ruler continuing to the blade of the tape measure as the flip stop component including the tape measure is moved horizontally away from the fence component along the stand for the cutting saw.

16. The cutting tool fence apparatus with measuring ruler of claim 15, wherein the fence component comprises a metal component including a steel, stainless steel or aluminum, metal component.

17. The cutting tool fence apparatus with measuring ruler of claim 15, wherein the measuring ruler is engraved on, etched on, included on a sticker or is projected on, with a projection component, the fence component.

18. The cutting tool fence apparatus with measuring ruler of claim 15, wherein the flip stop attachment component includes magnetic metal.

19. The cutting tool fence apparatus with measuring ruler of claim 15, wherein the fence component is manufactured from a larger piece of metal with a process taking into account the tensile and compressive forces in the larger piece of metal around the fence component, preventing the fence component from being deformed by an equilibrium process after manufacturing so the resulting fence component is manufactured with precise edges and precise ninety degree corners.

20. The cutting tool fence apparatus with measuring ruler of claim 15, further comprising a second fence component used with the first component creating a zero clearance fence component.

21. The cutting tool fence apparatus with measuring ruler of claim 15, further comprising:
a movable material stop component including one or two vertical material stop components for securely holding the piece of material on two surfaces against the fence component allowing for safe cutting with the saw blade on the cutting saw.

22. The cutting tool fence apparatus with measuring ruler of claim 15, further comprising:
a laser measuring component;
the laser measuring component connected with a laser beam to the fence attachment component,
the laser measuring component providing measurements of materials placed against the front surface on the fence component.

* * * * *